(12) United States Patent
Kullos

(10) Patent No.: US 9,306,798 B2
(45) Date of Patent: Apr. 5, 2016

(54) AGGREGATE MONITORING OF INTERNET PROTOCOL TELEVISION (IPTV) CHANNEL ACTIVITY ACROSS USER-BASED GROUPS OF PRIVATE COMPUTER NETWORKS

(71) Applicant: Guest Tek Interactive Entertainment Ltd., Calgary (CA)

(72) Inventor: Joseph Kullos, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 294 days.

(21) Appl. No.: 13/922,439

(22) Filed: Jun. 20, 2013

(65) Prior Publication Data

US 2013/0282899 A1    Oct. 24, 2013

Related U.S. Application Data

(63) Continuation of application No. 13/308,993, filed on Dec. 1, 2011, now Pat. No. 8,504,688.

(60) Provisional application No. 61/425,876, filed on Dec. 22, 2010.

(30) Foreign Application Priority Data

Dec. 22, 2010    (CA) .................................. 2724251

(51) Int. Cl.
*G06F 15/16*    (2006.01)
*H04L 29/08*    (2006.01)
(Continued)

(52) U.S. Cl.
CPC ........ *H04L 29/08675* (2013.01); *H04L 12/185* (2013.01); *H04L 41/509* (2013.01);
(Continued)

(58) Field of Classification Search
USPC .......................................................... 709/204
See application file for complete search history.

(56) References Cited

U.S. PATENT DOCUMENTS 7,020,082 B2    3/2006    Bhagavath et al.
7,805,338 B2*   9/2010    Kolls ........................... 705/26.1
(Continued)

FOREIGN PATENT DOCUMENTS

WO    0036807 A2    6/2000

OTHER PUBLICATIONS

SolarWinds, "Orion Enterprise Operations Console", copyright 2008, 2 pages.*

(Continued)

*Primary Examiner* — Richard G Keehn
(74) *Attorney, Agent, or Firm* — ATMAC Patent Services Ltd.; Andrew T. MacMillan

(57) ABSTRACT

A system for aggregate monitoring Internet Protocol television (IPTV) channel activity across user-based groups of private computer networks includes monitoring servers for monitoring private networks. Each private network has a monitoring server operable to receive multicast stream information from at least one switch on the private network, the multicast stream information indicating which ports of the at least one switch are joined to one or more multicast streams. A central server stores information associating users with a group of one or more of the private networks. The central server receives a request from a remote device via the WAN, determines the group of private networks associated with the requesting user, automatically generates a set of IPTV channel activity statistics according to only the statuses collected for each private network in the group associated with the requesting user, and sends the set of statistics to the remote device.

18 Claims, 17 Drawing Sheets

(51) Int. Cl.
  *H04L 12/24* (2006.01)
  *H04N 21/643* (2011.01)
  *H04N 21/258* (2011.01)
  *H04L 12/18* (2006.01)
  *H04L 12/26* (2006.01)

(52) U.S. Cl.
  CPC ........ *H04L41/5016* (2013.01); *H04L 41/5054* (2013.01); *H04N 21/25891* (2013.01); *H04N 21/64322* (2013.01); *H04L 41/0893* (2013.01); *H04L 43/0852* (2013.01); *H04L 43/0882* (2013.01)

(56) References Cited

U.S. PATENT DOCUMENTS

| | | | |
|---|---|---|---|
| 8,179,799 B2* | 5/2012 | Dolisy | 370/235 |
| 2003/0172145 A1* | 9/2003 | Nguyen | 709/223 |
| 2004/0152439 A1* | 8/2004 | Kimura et al. | 455/403 |
| 2004/0261116 A1* | 12/2004 | Mckeown et al. | 725/109 |
| 2005/0276232 A1 | 12/2005 | Ito et al. | |
| 2007/0019568 A1 | 1/2007 | Velupillai | |
| 2007/0117604 A1* | 5/2007 | Hill | 463/16 |
| 2009/0013210 A1* | 1/2009 | McIntosh et al. | 714/4 |
| 2009/0063274 A1* | 3/2009 | Dublin et al. | 705/14 |
| 2009/0141638 A1* | 6/2009 | Dolisy | 370/241 |
| 2009/0154348 A1* | 6/2009 | Newman | 370/230 |
| 2009/0154363 A1* | 6/2009 | Stephens | 370/241 |
| 2009/0316682 A1* | 12/2009 | Twitchell et al. | 370/351 |
| 2010/0290465 A1* | 11/2010 | Ankaiah et al. | 370/390 |
| 2011/0022812 A1* | 1/2011 | van der Linden et al. | 711/163 |
| 2011/0078326 A1* | 3/2011 | Horibuchi | 709/232 |
| 2011/0292818 A1* | 12/2011 | Zhytar et al. | 370/252 |
| 2012/0166628 A1 | 6/2012 | Kullos | |
| 2012/0278864 A1* | 11/2012 | Dugeon et al. | 726/4 |

OTHER PUBLICATIONS

SolarWinds, "Orion, Network Performance Monitor Administrator Guide", copyright 1995-2009, 352 pages.*
Guest-Tek; Overview; Sep. 18, 2009; 2 pages (referred to in the Office action as "Guest-Tek Overview").*
Guest-Tek; Product Catalog; published Sep. 18, 2009 or earlier with specific dates at the bottom of each page; 20 pages (referred to in the Office action as "Guest-Tek Product Catalog").*
Hewlett-Packard Development Company, "HP Operations Center", Feb. 2010, 4 pages.
Nagios Enterprises, "Nagios XI—Product Overview", Jan. 2010, 2 pages.
Hewlett-Packard Company, "hp OpenView operations 7.x for UNIX product brief", Aug. 2002, 8 pages.
Guest-Tek; Overview; Sep. 18, 2009; 2 pages.
Guest-Tek; Product Catalog; published Sep. 18, 2009 or earlier with specific dates at the bottom of each page; 20 pages.

* cited by examiner

Aggregate Summary

Properties in group: 30

| Percent (%) | Bandwidth Availability Receive | Transmit | Core Network Availability | Wireless Network Availability | DSL Modem Availability |
|---|---|---|---|---|---|
| 100-81 | 20 | 27 | 23 | 27 | 2 |
| 80-61 | 3 | 3 | 0 | 2 | 0 |
| 60-41 | 4 | 0 | 0 | 0 | 0 |
| 40-21 | 0 | 0 | 0 | 1 | 0 |
| 20-0 | 3 | 0 | 2 | 0 | 0 |

FIG. 5

Top 10 Server Latency in Group — 800

| Property Name | Router | Gateway Server |
|---|---|---|
| Plaza Chicago | 197 ms | 225 ms |
| Luxury Brand Hotel Detroit | 116 ms | 125 ms |
| Airport Hotel Los Angeles | 118 ms | 118 ms |
| San Francisco Deluxe Resort | 115 ms | 117 ms |
| Florida Spa Suites | 127 ms | 113 ms |
| New York City Garden Villas | 105 ms | 105 ms |
| Seattle Seascape Hotel | 96 ms | 104 ms |
| Milpitas Room on the Boardwalk | 101 ms | 101 ms |
| Texas Ranch Casino | 93 ms | 101 ms |
| Lincoln Bay Inn | 80 ms | 98 ms |

Example OID destination table ⬅ 1222

| Trap OID | Device type | Event description | Applicable destination(s) |
|---|---|---|---|
| 1.1.2.3.1.0 | Switch | Ethernet port 1 unplugged | Port A<br>Port B |
| ... | ... | ... | ... |
| 1.1.2.3.1.X | Switch | Ethernet port X unplugged | Port A<br>Port B |
| 1.1.2.3.4.120 | Satellite channel QAM streamer | Satellite channel 1 receive fault | Port A |
| ... | ... | ... | ... |
| 1.1.2.3.4.X | Satellite channel QAM streamer | Satellite channel X receive fault | Port A |
| 1.1.1.1.0 | PMS server | Backup power failure | Port A<br>Reporting.pms-vendor.com:PORT |
| ... | ... | ... | ... |

Satellite channel receive faults across group in last 10 minutes

Private hotel LANs in group: 25

| Channel | SNMP traps received | % of hotel LANs | Notice |
|---------|---------------------|-----------------|--------|
| 1 | 0 | 0.0% | - |
| 2 | 2 | 0.1% | - |
| 3 | 0 | 0.0% | - |
| 4 | 1 | 0.0% | - |
| 5 | 0 | 0.0% | - |
| 6 | 1 | 0.0% | - |
| 7 | 25 | 100% | FAULT! |
| 8 | 1 | 0.0% | - |
| ... | ... | ... | ... |
| N | 0 | 0.0% | - |

FIG. 14

Current guest Internet activity across group of hotel LANs

| Private hotel LANs in group: 35 | | % of total users | % of hotel LANs |
|---|---|---|---|
| Activity | | | |
| General web browsing | | 94% | 100% |
| VPN | | 8% | 17% |
| Bit torrent | | 3% | 86% |
| E-mail | | 96% | 57% |
| Video streaming | 256kbps | 22% | 60% |
| Bandwidth groups (>90% utilization) | 512kpbs | 63% | 100% |
| | 1Mbps | 16% | 71% |
| | 2Mpbs | 4% | 69% |
| Multi-device | | 17% | 75% |
| ... | | 55% | 95% |
| | | ... | ... |

AGGREGATE MONITORING OF INTERNET PROTOCOL TELEVISION (IPTV) CHANNEL ACTIVITY ACROSS USER-BASED GROUPS OF PRIVATE COMPUTER NETWORKS

CROSS-REFERENCE TO RELATED APPLICATIONS

This application is a continuation of U.S. patent application Ser. No. 13/308,993 filed Dec. 1, 2011, which claims the benefit of U.S. Provisional Application No. 61/425,876 filed Dec. 22, 2010 and Canadian Patent Application No. 2,724,251 filed Dec. 22, 2010. The disclosures of all of these applications are incorporated herein by reference.

BACKGROUND OF THE INVENTION (1) Field of the Invention

The invention pertains generally to monitoring private computer networks. More specifically, the invention relates to generating aggregate Internet Protocol television (IPTV) statistics across user-based groups of private networks.

(2) Description of the Related Art

In order to keep up with ever-increasing guest demands, it is common practice in the hospitality industry to outsource technology requirements such as hotel high speed internet access (HSIA) and digital entertainment systems to an external vendor. Hoteliers benefit from reduced costs and installation times by purchasing a guaranteed turn-key solution and are able to focus on their core business rather than wasting resources designing and supporting an in-house entertainment system. External vendors profit from developing a robust, customizable and feature extensive design and then selling it to multiple hotel properties.

A typical entertainment system involves a private local area network (LAN) installed within a hotel and separated from the public Internet using a gateway device. To provide adequate security, the gateway generally includes firewall functionality and ensures only authorized guests of the hotel are allowed to access the Internet. The system may further provide other features including guest billing and bandwidth control, and the private LAN may be combined with entertainment devices in the hotel such as in-room set-top boxes (STBs) to provide video-on-demand (VOD) and other capabilities to guests. In this way, the vendor may provide the hotel with a fully featured network and entertainment system. Although the vendor may essentially be selling the same system to different hotels, the onscreen look and feel and various features may be customized to allow hotels to differentiate themselves from competitors.

Because guest satisfaction may be negatively affected by poor in-room HSIA and entertainment system performance, it is desirable that the system provide feedback to the customer hotel regarding usage statistics and status information. This feedback may be helpful to the hotel when considering whether to upgrade the system. For example, the hotel may wish to know what percentage of its Internet bandwidth pipe was utilized at peak times or how many VOD movies were ordered by guests at different times of the day. Likewise, the hotel may also wish to know if there were any recent problems automatically detected by the system. To provide the hotel with feedback of the installed network, different vendor systems currently include reporting tools such as daily email reports for summary statistics and/or web-based console access for real-time statistics. In this way, administrators of each hotel may monitor the status of the installed system.

One problem with the current state of the art is it is cumbersome for owners or administrators of multiple hotel properties to monitor the network statistics of all the properties under their supervision. For example, a particular group of hotels may all be owned and administered under a single entity such as a common owner or chain headquarters. Because each hotel's system has a separate reporting tool that only concerns itself with monitoring devices on its own private network, it is difficult to quickly observe the overall status of the entire group of properties as a whole. Also, comparing individual statistics of devices of different hotel private networks is manually intensive as the desired data from each property must be collected and organized by an operator.

BRIEF SUMMARY OF THE INVENTION

According to a configuration of the invention there is disclosed a system for aggregate monitoring of Internet Protocol television (IPTV) channel activity across user-based groups of private computer networks. The system includes a plurality of monitoring servers installed on a respective plurality of private networks. Each private network includes at least one monitoring server operable to receive multicast stream information from at least one switch on the private network. The multicast stream information indicating which ports of the at least one switch are joined to one or more multicast streams. The system further includes a central server coupled to each of the monitoring servers for receiving the multicast stream information from the plurality of monitoring servers via a wide area network (WAN). The central server includes a storage device storing information pertaining to a plurality of users, the information respectively associating each of the users with a group of one or more of the private networks. The central server is configured to receive a request from a remote device via the WAN, the request indicating a requesting user that issued the request; and determine the group of private networks associated with the requesting user according to the information stored in the storage device. The central server is further configured to automatically generate a set of IPTV channel activity statistics according to the multicast stream information for only the group of the private networks associated with the requesting user; and send the set of IPTV channel activity statistics to the remote device via the WAN in response to the request.

According to another configuration of the invention there is disclosed a method of aggregate monitoring of Internet Protocol television (IPTV) channel activity across user-based groups of private computer networks. The method includes providing a plurality of monitoring servers installed on a respective plurality of private networks; utilizing at least one monitoring server on each private network for receiving multicast stream information from at least one switch on the private network, wherein the multicast stream information indicates which ports of the at least one switch are joined to one or more multicast streams; and receiving, by a central server, the multicast stream information from the plurality of monitoring servers via a wide area network (WAN). The method further includes storing information pertaining to a plurality of users, the information respectively associating each of the users with a group of one or more of the private networks; receiving a request at the central server from a remote device via the WAN, the request indicating a requesting user that issued the request; and determining the group of private networks associated with the requesting user according to the information stored in the storage device. The method further includes automatically generating a set of IPTV channel activity statistics according to the multicast stream information for only the group of the private networks associated with the requesting user; and sending the set of IPTV channel activity statistics by the central server to the remote device via the WAN in response to the request.

These and other embodiments and advantages of the embodiments of the present invention will become apparent from the following detailed description, taken in conjunction with the accompanying drawings, illustrating by way of example principles of the invention.

BRIEF DESCRIPTION OF THE DRAWINGS

The invention will be described in greater detail with reference to the accompanying drawings which represent preferred embodiments thereof, wherein:

FIG. 5 illustrates a UI screen presenting an aggregate summary for an exemplary first user group including thirty hotel private networks.

FIG. 8 illustrates a UI screen presenting an exemplary top ten list of gateway latencies in a fourth user group including ten or more private networks.

FIG. 13 illustrates an example of the object identifier (OID) destination table of FIG. 12.

FIG. 14 illustrates a UI screen presenting an aggregate summary of satellite channel receive faults across a group of twenty-five private hotel LANs according to an exemplary configuration of the invention.

FIG. 15 illustrates a UI screen presenting an aggregate summary of current guest Internet activity across a group of thirty-five private hotel LANs according to an exemplary configuration of the invention.

DETAILED DESCRIPTION OF THE INVENTION

Figure 1:
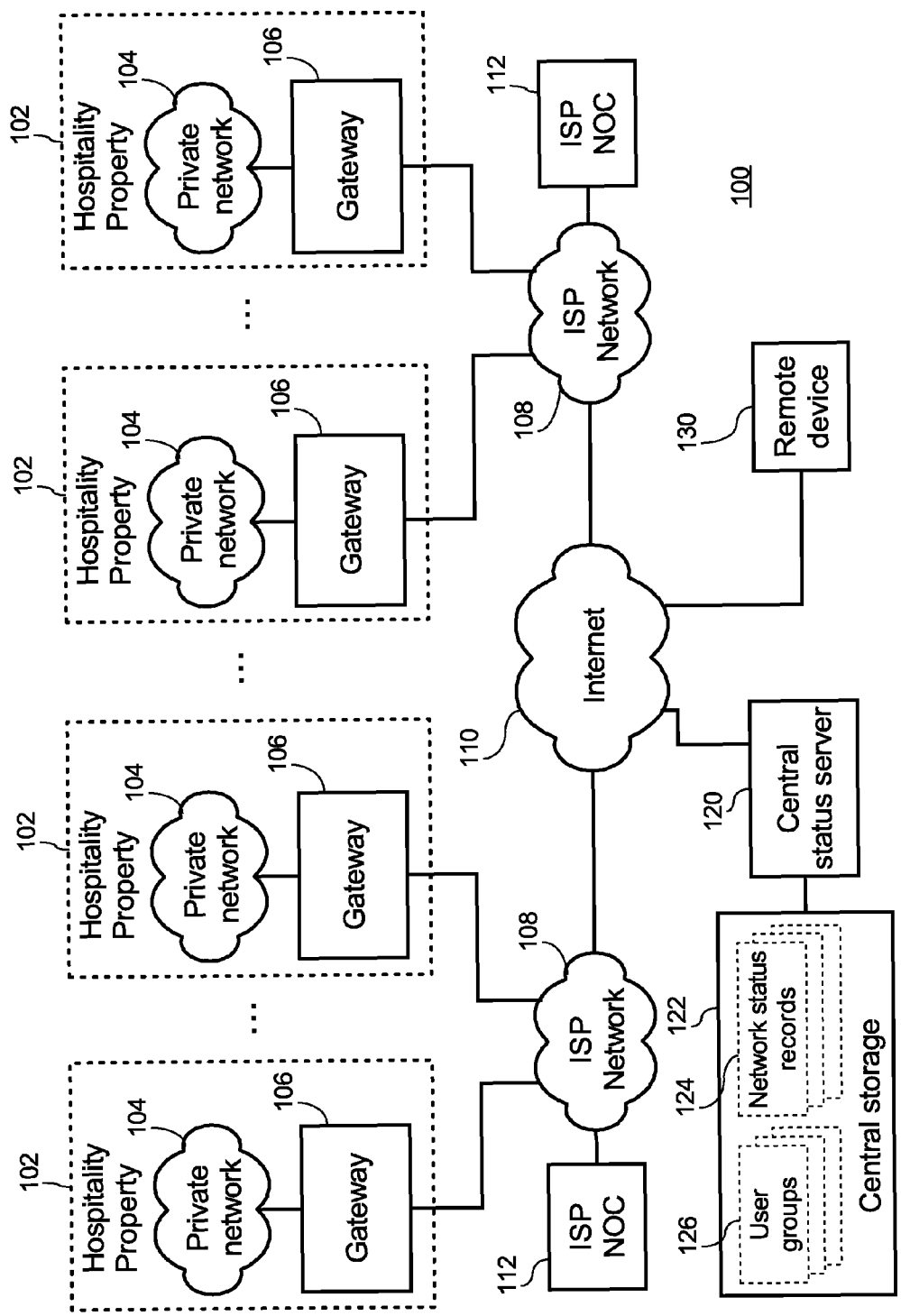
FIG. 1 illustrates a block diagram of a system for aggregate monitoring of a plurality of private computer networks according to an exemplary configuration of the present invention.

FIG. 1 shows a block diagram of a system 100 for aggregate monitoring of a plurality of private computer networks 104 according to an exemplary configuration of the present invention.

To illustrate one beneficial application of the invention, in this configuration, each private network 104 is located at a different hospitality property 102 such as a hotel, and each hotel 102 may have contracted an external vendor to install and possibly support its private network 104. The private network 104 at each hotel 102 may provide guests and hotel staff with various high-tech features including wired and wireless high speed Internet access (HSIA), in-room video-on-demand (VOD), property management system (PMS) billing integration, television (TV) based spa bookings, television based room service ordering, etc.

In this configuration, a central status server 120 is provided by the external vendor in order to store status records 124 related to each of the hospitality properties 102 that have purchased a private network 104 from the external vendor. The central status server 120 is coupled to the Internet 110 to provide web based access of aggregate statistics based on user groups 126, which may respectively associate each of a plurality of users with a group of one or more of the private networks 104. Providing users with different sets of statistics based on user-based groups 126 of hotel properties 102 may be useful, for example, to allow a particular user who is an administrator or owner of a chain of multiple hotels 102 to view web-based aggregate statistics of the chain of hotels from any remote device 130 coupled to the Internet 110.

In the following description, the situation where the private networks 104 are associated with hotels will be continued to provide an understanding of this beneficial application of the invention; however, the invention is also applicable to monitoring private networks 104 in other applications and locations, and it is a not a requirement of the invention that the private networks 104 be located at hotels.

Referring to FIG. 1, a gateway 106 separates each private network 104 from a wide area network (WAN) formed by, for example, Internet Service Provider (ISP) network 108 and the Internet 110. Each ISP network 108 may be controlled by a respective ISP network operations center (NOC) 112. The central status server 120 is coupled to each of the gateways 106 via the WAN 108, 110 and includes storage 122 for storing information pertaining to a plurality of user groups 126 and a plurality of status records 124. In one configuration, each status record 124 corresponds to one of the private networks 104 and stores data recording changes of statuses over time for devices associated with the private network 104. In a preferred configuration, to facilitate searching and storage efficiency, the status records 124 are stored as database records within a database stored at the central storage 122; however, in different configurations, the status records 124 may be stored in different ways such as each status record 124 being stored as a file based status log, for example.

Figure 2:
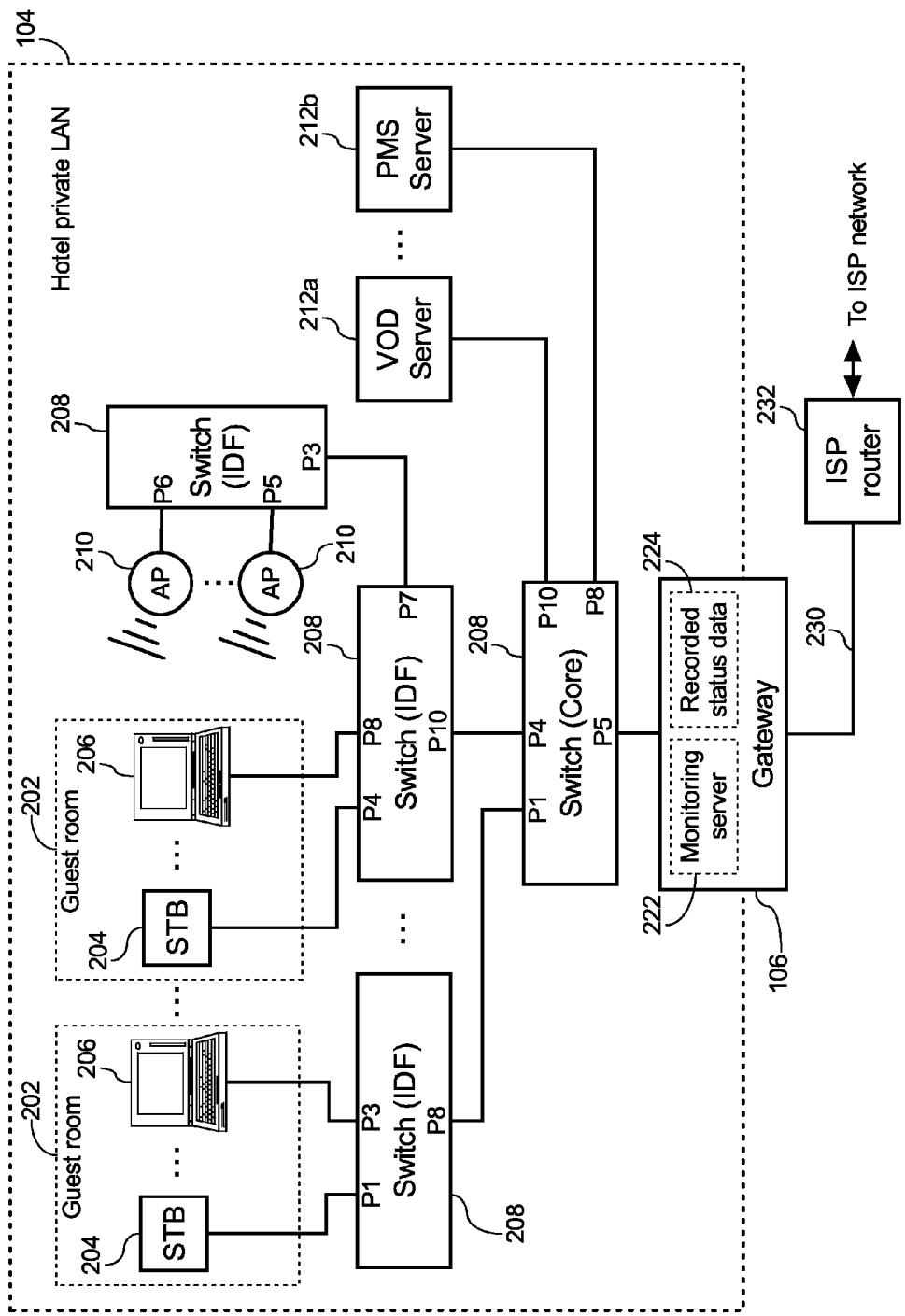
FIG. 2 illustrates a block diagram of devices associated with a hotel's private local area network (LAN) according to an exemplary configuration of the present invention.

FIG. 2 illustrates a block diagram of devices associated with a hotel's private local area network (LAN) 104 according to an exemplary configuration of the present invention.

Each private network 104 includes at least one monitoring server 222 for monitoring the private network 104 by collecting statuses of devices on the private network 104, and recording collected status information 224 for transmission to the central status server 120. In this example, the monitoring server 222 is integrated within the gateway 106 to facilitate monitoring of the connection 230 and the ISP router 232; however, in other configurations, the monitoring server 222 may be located anywhere on or off the private network 104. Additionally, the private network 104 may further include a plurality of monitoring servers 222, for example, each collecting statuses for different types of devices associated with the private network 104.

As shown, the devices monitored by the monitoring server 222 may include any of the devices installed on the private network 104 such as switches 208, set-top boxes (STBs) 204, guest computing devices 206, wireless access points (APs) 210, and servers 212, for example, video-on-demand (VOD) server 212a and property management system (PMS) server 212b. These devices may be physically located anywhere within the hotel such as guest rooms 202, the hotel lobby, or server rooms. Additionally, devices not directly connected to the private network 104 but nonetheless associated with the private network 104 may also be monitored such as the Internet pipe connection 230 and ISP router 232. Any desired status aspects of any devices associated with the private network 104 may be monitored.

Polling techniques by the monitoring server 222 may be utilized to collect status information such as when the monitoring server 222 polls each of the switches 208 using simple network management protocol (SNMP) to determine which ports P1-P10 of each switch 208 are currently in active use. Because the monitoring server 222 in this example is included on the private network 104, the monitoring server 222 may directly poll the private addresses utilized by the devices 204, 206, 208, 210, 212 on the private network 104. An advantage of this configuration is no holes in a firewall (e.g., implemented by gateway 106) protecting private network 104 need be opened to allow an external SNMP manager to poll the devices 204, 206, 208, 210, 212 installed on the private network 104. In other words, by including the monitoring server 222 on the private network 104, the gateway 222 may be configured to block network connection requests originating from the Internet 110, which increases the security of the private network 104.

Another advantage of this configuration is there is no requirement to maintain a virtual private network (VPN) or other secure tunnel connecting an external SNMP manager to the devices installed on each of the private networks 104, which further increases security of each private network 104 while also allowing the allocation of private addresses assigned to the devices installed on each private network 104 to be independent of the other private networks 104. By including a monitoring server 222 on each private network 104, each private network 104 can utilize private IP addresses of devices without regard to the private IP addresses assigned to devices being monitored on other private networks. Unlike a VPN based monitoring solution, in this configuration of the invention there is no need for an HSIA vendor to prevent conflicts between IP addresses assigned to devices being monitored across different hotels LANs. This is particularly beneficial when each private network 104 is essentially a copy of the HSIA vendor's design. Hotel LANs may reuse the same private IP addresses for installed devices while still allowing aggregate statistics to be generated for devices monitored across any group of the hotel LANs by the central server 120.

In another example, the monitoring server 222 may collect status information by receiving updates from devices associated with the private network 104 such as when the VOD server 212a sends a message to the monitoring server 222 indicating the number of movies that have been ordered by guests in a recent time period. Different types of devices and statuses of said devices may be monitored in similar ways, and, as changes are detected, the recorded status data 224 is updated accordingly. Again, when the monitoring server 222 is included on the private network 104, communication between the devices installed on the private network 104 and the monitoring server 222 only needs to use private IP addresses of the private network 104. Alternatively, the monitoring server 222 may be located off the private network 104. As firewalls are often preconfigured to allow outgoing connection requests from the private network 104 toward the Internet 110, an offsite monitoring server 222 may be able to receive updates from devices 204, 206, 208, 210, 212 installed on the private network 104 without requiring any additional rules be configured in a firewall protecting the private network 104.

Figure 3:
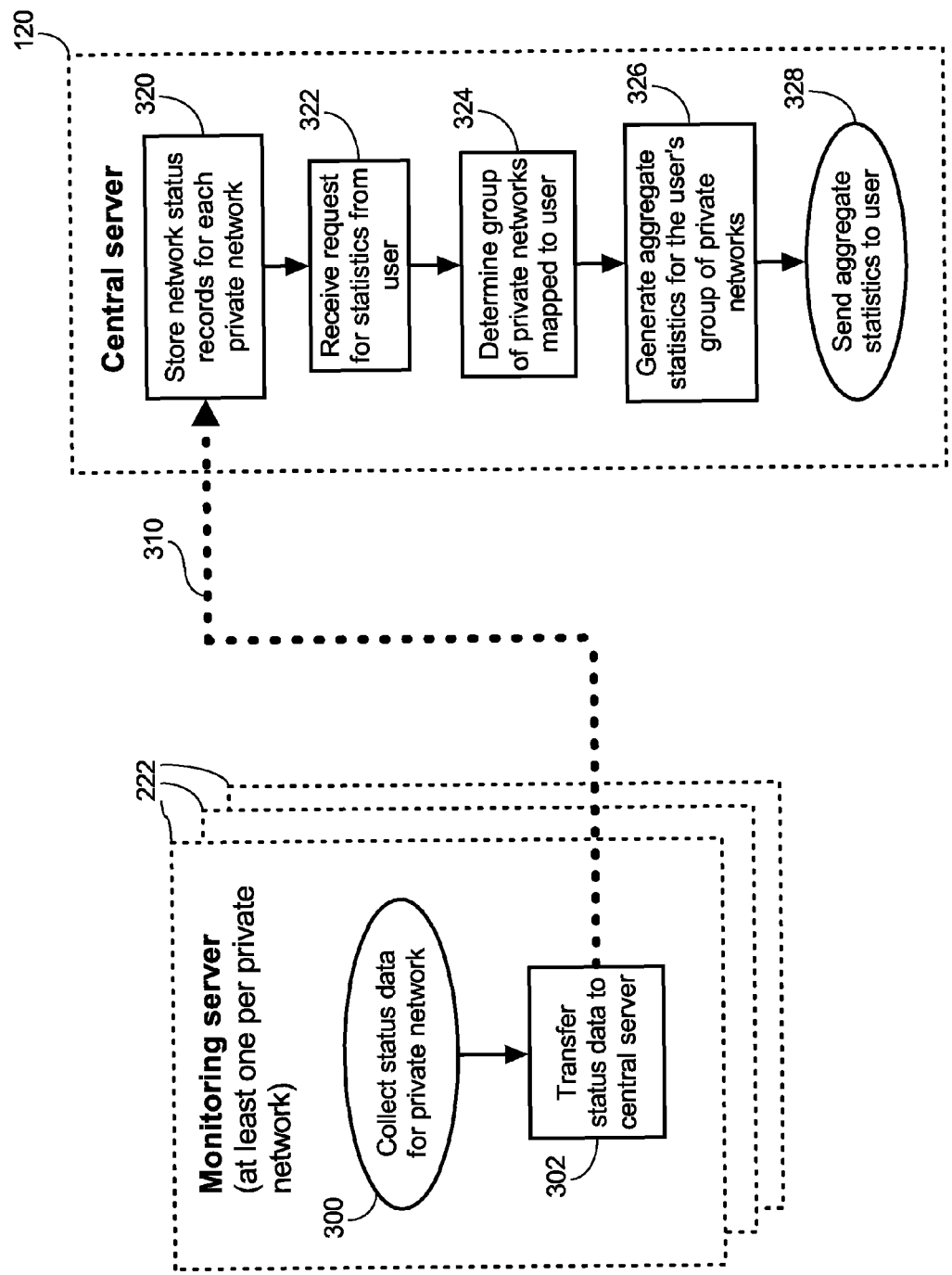
FIG. 3 illustrates a flowchart of operations performed by each monitoring server of FIG. 2 and the central status server of FIG. 1 according to an exemplary configuration of the present invention.

FIG. 3 illustrates a flowchart of operations performed by each monitoring server 222 and the central status server 120 according to an exemplary configuration of the present invention. The steps of the flowchart are not restricted to the exact order shown, and, in other configurations, shown steps may be omitted or other intermediate steps added. In this example, each monitoring server 222 performs the following steps:

Step 300: At least one monitoring server 222 per private network 104 monitors devices associated with the private network 104. To maximize data storage and transfer efficiency, in one configuration, the monitoring server 222 repeatedly (e.g., periodically and/or intermittently, etc) collects the statuses of the various devices on the private network 104, and records data 224 at the monitoring server 222 indicating changes in the statuses of the devices over time. As mentioned, the devices associated with the private network 104 may also send status information directly to the monitoring server 222.

Step 302: The monitoring server 222 transfers the data collected at step 300 to the central status server 120 over the WAN 108, 110. For example, in one configuration, each monitoring server 222 is configured to periodically send a report 310 to the central server 120 via the WAN 108, 110. The report 310 may indicate to which private network 104 it pertains and include the data indicating the changes recorded by the monitoring server at step 300 since a last report 310 was successfully sent to the central server. In this way, if for some reason a report 310 is not successfully sent, e.g., such as may occur when the connection 230 to the ISP network 108 goes down, a next report 310 will include both the previously sent status data and any new status data. Additionally, if there are no changes detected for any devices associated with the private network 104 since a last report 310 was successfully sent, the monitoring server 222 may continue to periodically send reports to the central status server 120 with an empty set of data. These empty reports 310 act as heartbeat messages; in this way, when receiving a heartbeat message from a monitoring server 222 at a particular hotel 102, the central server 120 may thereby determine that both the monitoring server 222 and the connection 230 to the ISP network 108 are still functioning at that particular hotel 102 and that no status changes have occurred. The report 310 may also be sent via other means including uploading the report using a web service of the central server 120, sending the report 310 in an email message to the central server 120, or encapsulating the report 310 in any type of packet or other network message for transmission to the central server 120. Depending upon the type of transmission method, the central server 120 may acknowledge the successful receipt of the report 310. For example, using a success message after upload via the web service, sending an acknowledge email message back to the monitoring server, or any other type of acknowledge message according to the transmission method.

Step 302 may also be modified in other configurations such that some or all of the monitoring servers 222 transfer their recorded status data 224 to the central server 120 when the central server 120 makes a specific request. For example, to avoid becoming overloaded when the monitoring servers 222 at a plurality of hotels 102 send reports 310 at substantially the same time, the central server 120 may instead periodically poll the monitoring server 222 at each private network 104 via the WAN 108, 110 and download a newer portion of the data 224 indicating the changes recorded at the monitoring server 222 since a previous time the central server successfully polled the monitoring server 222.

Continuing the flowchart shown in FIG. 3, in this example, the central status server 120 performs the following steps:

Step 320: The central status server 120 receives the report 310 (or receives the recorded status data 224 using other means) from the monitoring server 222 and stores a plurality of status records 124 corresponding to the various private networks 104 being monitored. For example, the central server 120 may store the newer portion of the data received from each monitoring server 222 as a corresponding status record 124 in the storage device 122. When the status records 124 are implemented as database records, this step may involve storing the newer portion of the data by adding or updating a corresponding database record; alternatively, when the status records 124 are implemented as status logs, this step may involve appending the newer portion of the data to a corresponding status log file.

Step 322: The central status server 120 receives a request from a remote device 130 via the WAN 108, 110. In this configuration, the request indicates a requesting user being the user that issued the request. The request may indicate the requesting user by including the username/password combination for the user that made the request. In other examples, the remote device 130 may be associated with a particular internet protocol (IP) or media access control (MAC) address (e.g., source IP/MAC address of the request) that corresponds to and thereby indicates the requesting user, or a cookie file stored in a web browser of the remote device and sent along with the request may indicate the requesting user. To facilitate easy web based access, the central status server 120 may act as a web server by receiving the request being a web service request and sending the response (at step 328) being a web service response. The web service may either be either typical web site accessed through a browser or may be a web based application programming interface (API) accessed through an application program executed on the remote device 130.

Step 324: The central status server 120 determines the group of private networks associated with the requesting user according to the user group information 126 stored in the storage device 122. For example, each user may be associated with a single private network 104 such as may be beneficial to an owner or administrator of a single hotel 102, more than one but fewer than all the private networks 104 such as may be beneficial to an owner or administrator of multiple hotels 102, or all private networks 104 such as may be useful to a staff member of the external system vendor for monitoring all hotels 102 supported by the external vendor. Different users may be associated with different user groups 126.

Step 326: The central status server 120 automatically generates a set of statistics according to only the status records 124 stored in the storage device 122 for each private network 104 in the user group 126 associated with the requesting user (determined at step 324). For instance, an owner of a chain of hotels 102 having a group determined at step 324 including the hotels 102 in the chain will have the set of statistics generated at this step according to the statuses collected for each private network 104 in the chain of hotels and not according to the statuses collected for other private networks 104 that are not in the chain of hotels.

Step 328: The central status server 120 sends the set of statistics to the remote device 130 via the WAN 108, 110 in response to the request. As mentioned, this may be done by sending a web response to the remote device 130, or may done using other techniques such as sending an email report or other network message that is received at the remote device 130.

Figure 4:
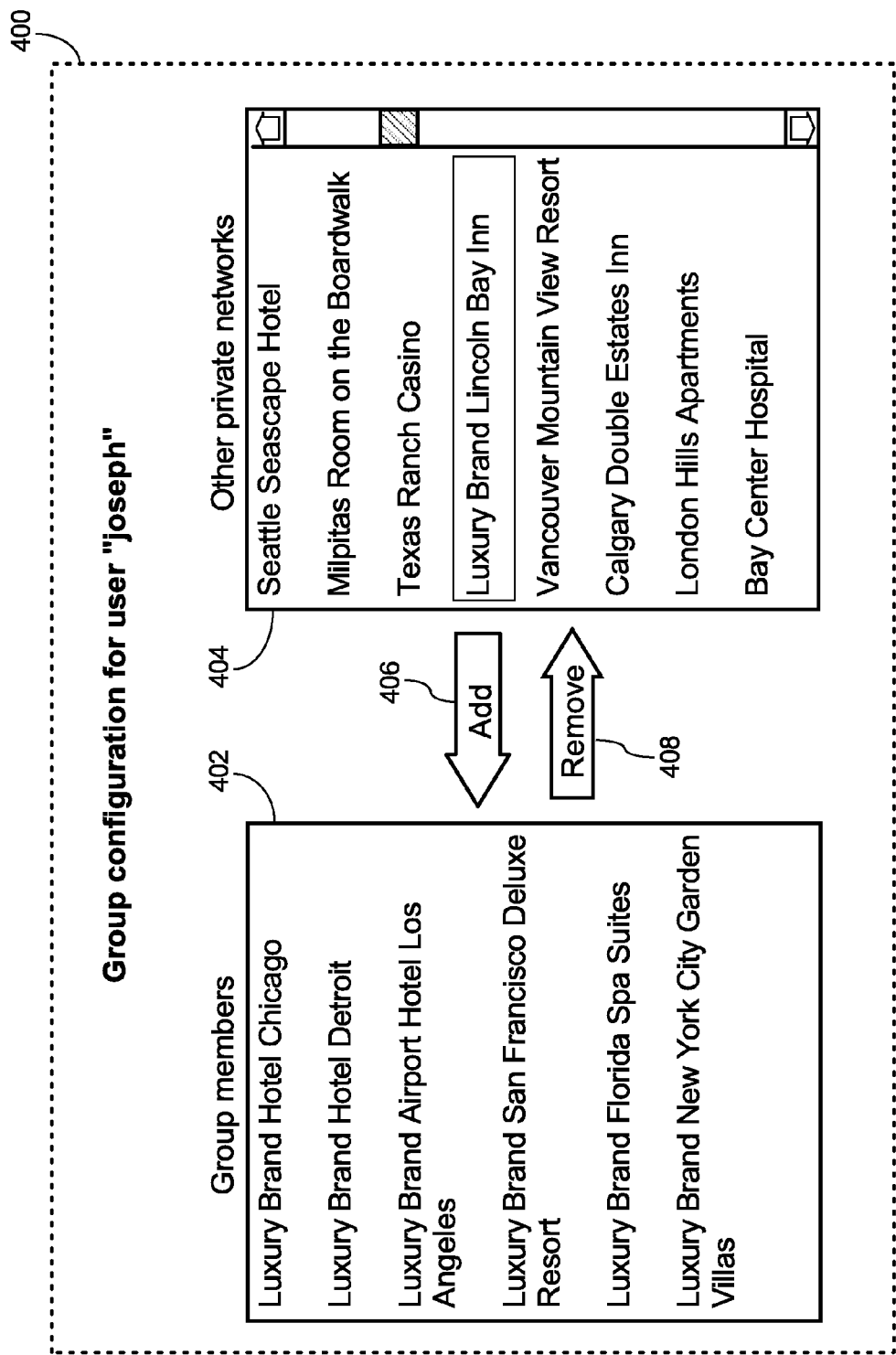
FIG. 4 illustrates a user interface (UI) screen for configuring a group of private networks for an exemplary user.

FIG. 4 illustrates a user interface (UI) screen 400 for configuring a group 402 of private networks 104 for an exemplary username "joseph". In this example, the central status server 120 is configured to allow an administrator or other authorized user to change which of the private networks 104 are included in the user group 126 for each of the various users. As shown in FIG. 4, each private network 104 is associated with a particular hotel property 102, and the username "joseph" may correspond to an owner of the "Luxury Brand" brand of hotels and resorts. To allow this user to view aggregate statistics related to all the private networks 104 for the "Luxury Brand" hotels 102, the group 402 for this user includes multiple "Luxury Brand" property names (i.e., corresponding to hotels 102 for which the username "joseph" is responsible). Other private networks 404 not in the group 402, e.g., the selected "Luxury Brand Lincoln Bay Inn", may be added to the group 402 by selecting the desired property name and clicking the add button 406. Likewise, private networks 104 in the group 402 may be removed from the group 402 by selecting the unwanted property name and pressing the remove button 408.

FIG. 5 to FIG. 9 illustrate various UI screens 500, 600, 700, 800, 900 showing examples of different sets of statistics that may be generated by the central status server 120 at step 326 and sent to the remote device 130 at step 328 of FIG. 3.

FIG. 5 illustrates a UI screen 500 presenting an aggregate summary for an exemplary first user group 126 including thirty hotel private networks 104. Each private network 104 is located at a hotel property 102 such as illustrated in FIG. 1, and the aggregate summary 500 shown in FIG. 5 is generated by the central status server 120 according to the statuses of each of the private networks 104 in the first user group 126 as collected by the associated monitoring servers 222. A percent column 502 indicates a percentage of the private networks in the first user group 126 that meet the designated percentage thresholds as organized in the various rows. The values of the aggregate summary may be colored to indicate desirability according to the percentage, for example, green on the "100-81" row meaning no problems, then shades of yellow and orange going down towards the "20-0" row being in red indicating a potential availability problem.

The bandwidth availability column 504 indicates how many properties are at each percentage for both receive bandwidth availability and transmit bandwidth availability. For example, a particular hotel private LAN 104 may be coupled to an ISP network 108 by a connection 230 having a maximum of 6 Mbps receive bandwidth capacity and the same for transmit bandwidth capacity. In the event that at least eighty-one percent of that capacity is available for reception of information from the WAN 108, 110, that property will be included in the number on the "100-81" row in the "Receive" column of column 504. If the property has 20% utilization of receive bandwidth, then it would be listed in the "80-61" row, and so on. Similarly, the numbers of properties 102 that have private LANs 104 meeting the various percentages 502 for transmit bandwidth are also listed in column 504.

Core network availability column 506 indicates the number of properties that are at each percentage in terms of core network availability. In this example, core network availability corresponds to the switches 208 and possibly a digital subscriber line access multiplexer (DSLAM) for private networks 104 having such equipment. The percentage of properly functioning switches 208 and DSLAM units with respect to the total number of switches and DSLAM units associated with each private network 104 determines on which row the property will be counted. It should also be noted that the total number of properties indicated in column 506 does not add up to thirty (i.e., the total number of private networks 104 in the first user group 126) because five private networks 104 in this example do not have any managed switches or DSLAM equipment to monitor. This may be the case when a particular private network 104 includes only (unmanaged) hubs and does not use DSL, for example.

The wireless network availability column 508 indicates how many properties 102 are at each percentage in terms of availability of the wireless APs 210, and the digital subscriber line (DSL) column 510 indicates the number of properties 102 at each percentage in terms of digital modem availability. Again, the sum of all properties in these columns 508, 510 may not sum to the total number of properties in the first user group 126 when not all private networks 104 in the group include wireless APs 210 or have DSL modems.

Figure 6:
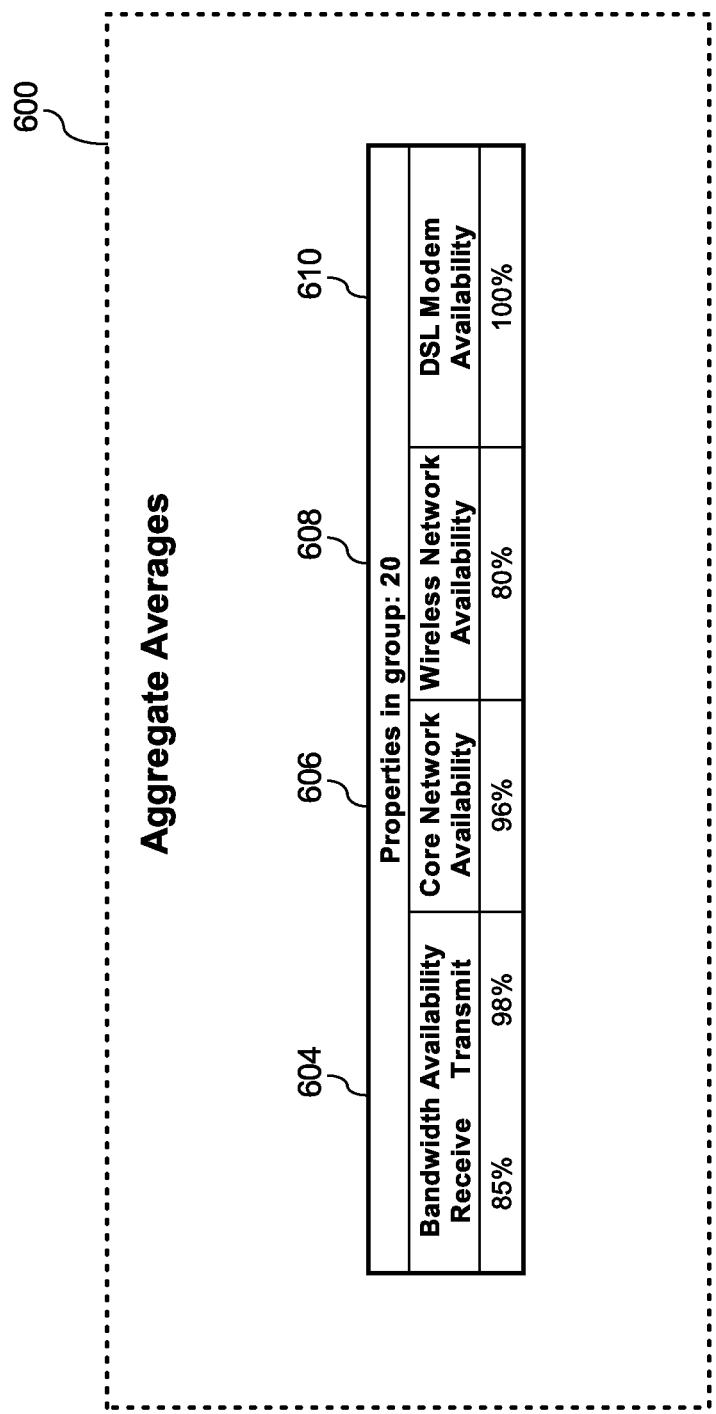
FIG. 6 illustrates a UI screen presenting a set of aggregate averages for a second exemplary user group including twenty private networks.

FIG. 6 illustrates a UI screen 600 presenting a set of aggregate averages for a second exemplary user group 126 including twenty private networks 104. Illustrated are percentages for bandwidth availability (column 604), core network availability (column 606), wireless network availability (column 608), and DSL modem availability (column 610). The columns 604-610 correspond to the columns 504-510 previously described for FIG. 5, but, in FIG. 6, the value presented is the average percentage of the second user group 126 as a whole rather than the number of properties in the group at each percentage level as shown in FIG. 5.

Figure 7:
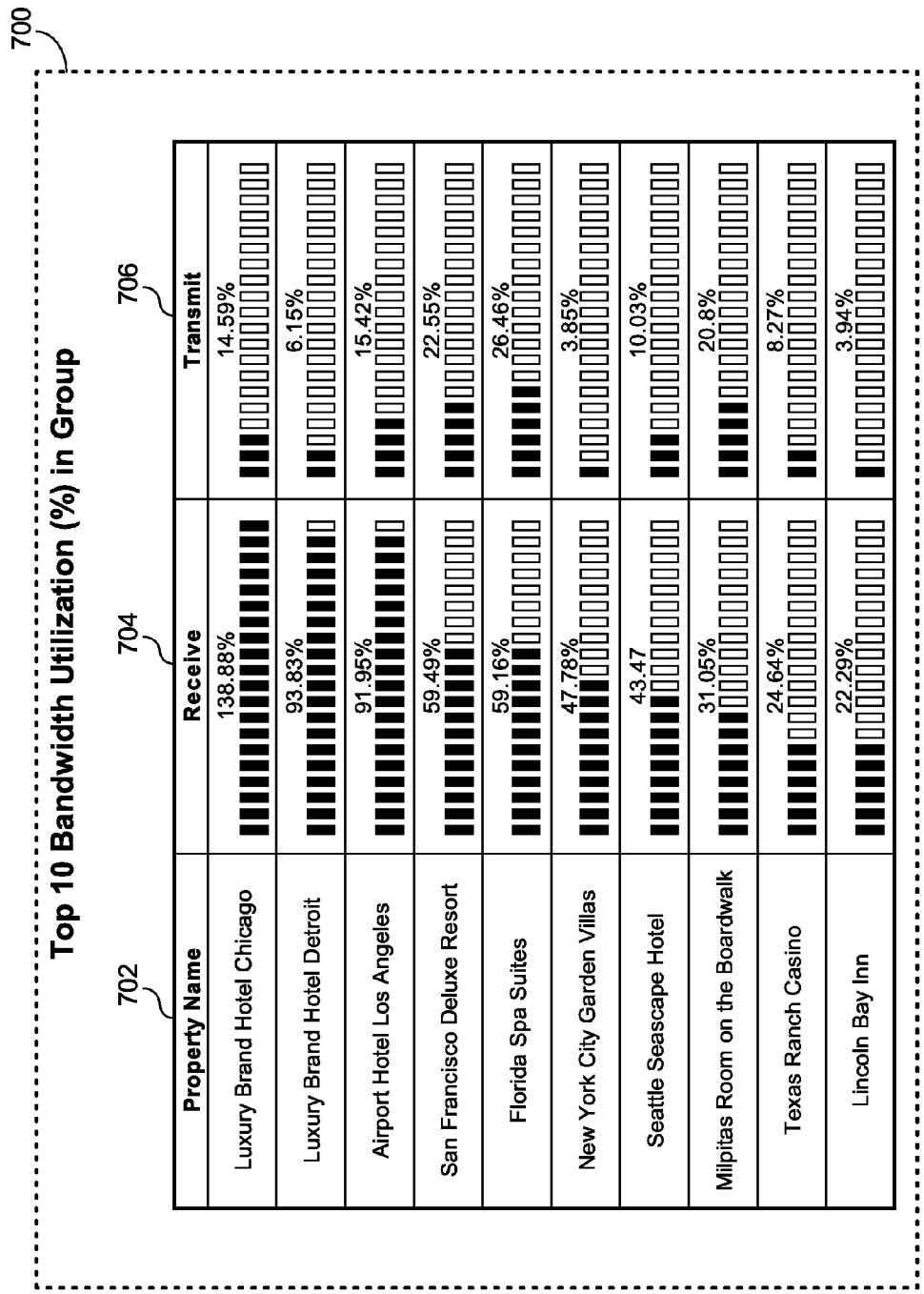
FIG. 7 illustrates a UI screen presenting an exemplary top ten list of receive bandwidth utilizations in a third user group including ten or more private networks.

FIG. 7 illustrates a UI screen 700 presenting an exemplary top ten list of receive bandwidth utilizations in a third user group 126 including ten or more private networks 104. The property 102 associated with the private network 102 having the highest receive bandwidth utilization is shown at the top and the list is sorted in descending order according to each private network's 104 receive bandwidth utilization. The name of the hotel 102 is shown in column 702; the receive bandwidth utilization of connection 230 is shown in column 704; and the transmit utilization of connection 230 is shown in column 706. The utilization percentages may be calculated by dividing a measured bandwidth throughput by a total bandwidth throughput provided by the ISP connection 230, the value of which may be stored at either the central server 120 or each of the respective monitoring servers 222. Concerning the "138.88%" receive bandwidth utilization illustrated in the top row of the table, values over 100% may indicate either a momentary surge of data exceeding the theoretical limit of ISP connection 230, or may indicate a record keeping or configuration problem where the actual limit of the ISP connection 230 is higher than the intended or stored value. In either case, when encountering values over 100%, the central server 120 may be configured to automatically issue an alarm message to ether the user(s) associated with the private network 104, an administrator of the central server 120, and/or an external vendor supporting the private networks 104 (see the below description of alarm conditions for FIG. 10).

FIG. 8 illustrates a UI screen 800 presenting an exemplary top ten list of server latencies in a fourth user group 126 including ten or more private networks 104. The list is sorted in descending order of gateway 106 latency, where column 802 indicates the name of the hotel 102 and the times in the gateway server column 806 may be determined by the central server 120 or the monitoring server 222 pinging the various gateways 106 associated with each of the private networks 104 in the fourth user group 126. The router column 804 refers to the ping time latency to the ISP router 232 associated with the private network 104. The values in this column 804 may be determined by the central status server 120 or the monitoring server 222 pinging the ISP router 232, for example.

Figure 9:
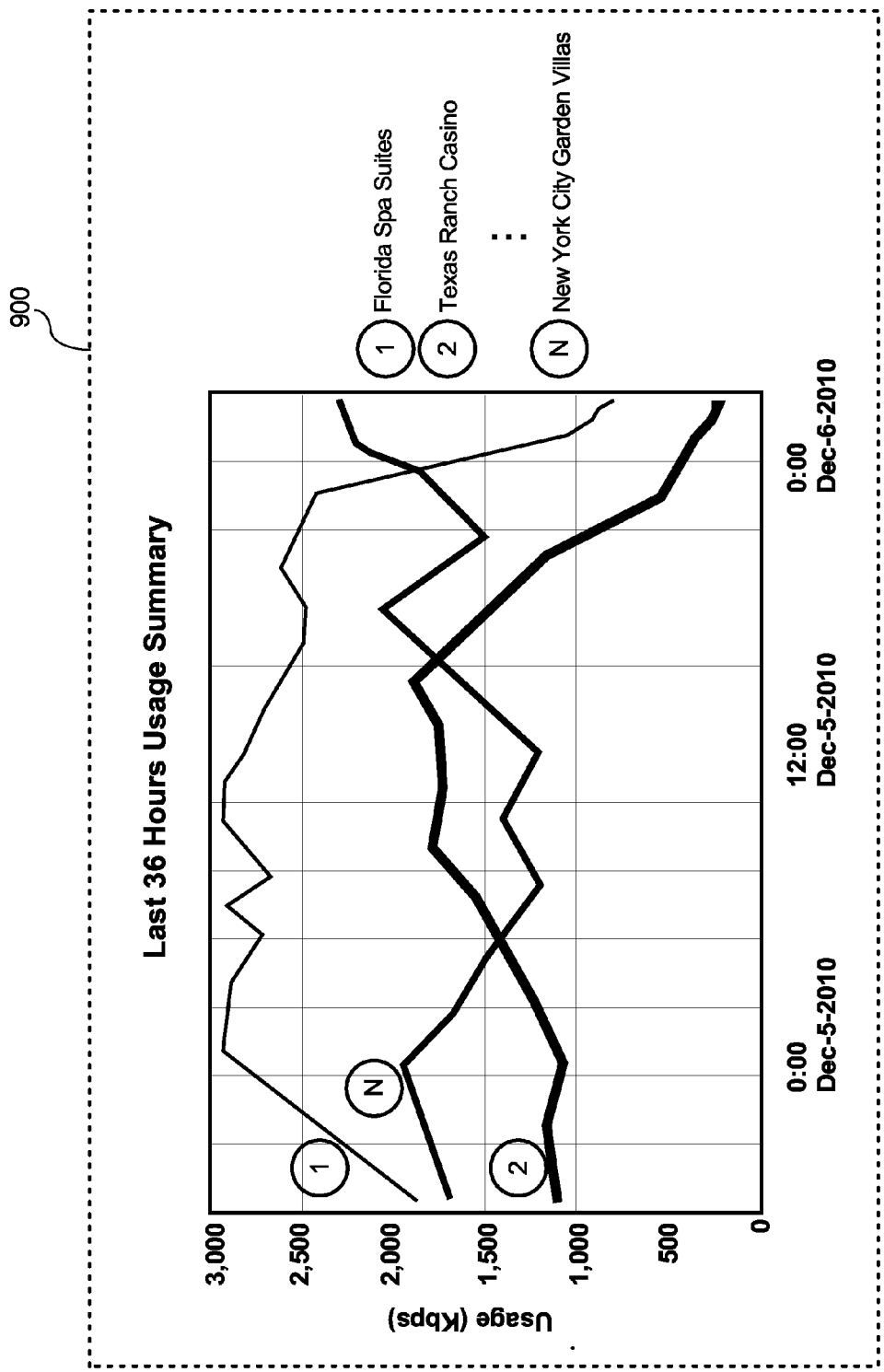
FIG. 9 illustrates a UI screen presenting a graphical comparison of receive bandwidth utilizations for the last 36 hours between a plurality of private networks in an exemplary fifth user group.

FIG. 9 illustrates a UI screen 900 presenting a graphical comparison of receive bandwidth utilizations for the last 36 hours between a plurality of private networks 104 in an exemplary fifth user group 126. The requesting user 130 may issue a request (e.g., received at step 322) to graphically compare any statistic (e.g., receive bandwidth utilization in this example) between any number of the properties in the user's group 126. The request may also indicate a period of time for the comparison such as 36-hours in this example.

Although, in the examples of FIG. 5 to FIG. 9, the various aggregate statistics are presented as being related to hospitality properties 102, the statuses of each property 102 are actually collected by the monitoring servers 222 from devices associated with the private networks 104. The property name may be utilized to help the requesting user correlate the various private networks 104 to their corresponding properties 102. In other configurations, the statistics of UI screens 500, 600, 700, 800, 900 may be presented using other names to identify the private networks 104 rather than property name, for example, private network ID numbers, corporation names, department names, faculty numbers, etc.

Figure 10:
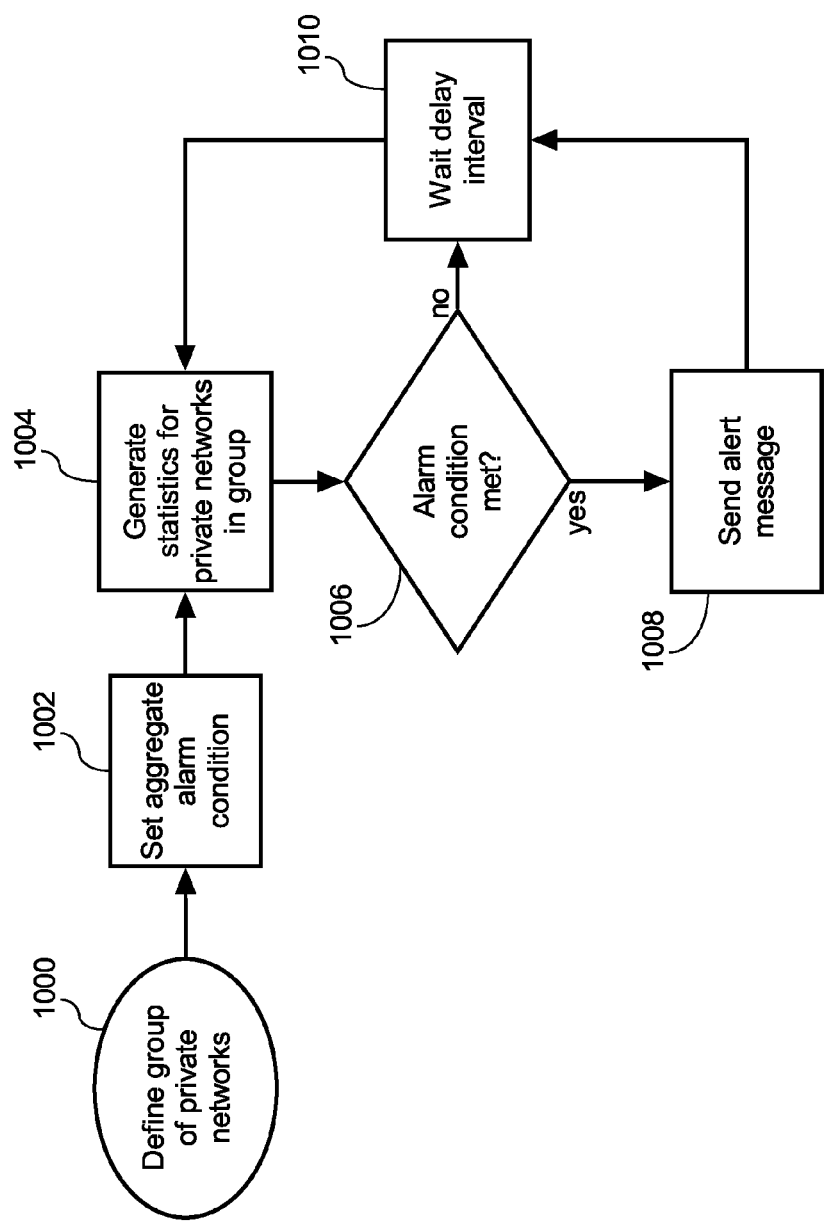
FIG. 10 illustrates a flowchart of aggregate alarm processing as performed by the central server according to an exemplary configuration of the present invention.

FIG. 10 illustrates a flowchart of aggregate alarm processing as performed by the central server 120 according to an exemplary configuration of the present invention. The steps of the flowchart are not restricted to the exact order shown, and, in other configurations, shown steps may be omitted or other intermediate steps added. In this example, the central server 120 performs the following steps:

Step 1000: In this step, an administrator or any other authorized user may define a group 402 of private networks 104 for a particular user such as by using the UI screen 400 shown in FIG. 4. In this example, the group 402 for each user may remain fairly stable over time with changes only needing to be entered, for example, when a new hotel 102 associated with the user is built or acquired. Once the group 402 is defined for a particular user, this information is stored as a part of the user groups 126 at the central server 120.

Step 1002: A user may utilize a web interface or other means to set one or more aggregate alarm conditions at this step. An alarm condition is associated with the user and applies to the group 402 of private networks 104 defined for the user at step 1000. In one example, the user may set an alarm that will be triggered when any private network 104 in the group 402 exceeds a threshold, for example, exceeds 90% receive bandwidth utilization. This type of aggregate alarm saves time because the user may set a single alarm that then automatically applies to all private networks 104 in the group 402 defined at step 1000. Additionally, the group 402 may be changed at any time and the alarm will automatically apply to the changed group 402 without any further configuration. In another example, the alarm may apply to the group 402 as a whole such as when one of the average values for the group 402 shown in the UI screen 600 of FIG. 6 exceeds a threshold. Again, as the group 402 changes, the alarm will apply to the new group 402.

Step 1004: The central server 1004 may periodically generate a set of statistics for the group 402 defined at step 1000 in order to check whether the alarm condition defined at step 1010 is met.

Step 1006: Is the alarm condition met? If yes, control proceeds to step 1008; otherwise, control proceeds to step 1010.

Step 1008: The central status server 120 sends an alert message to a user-configurable destination via the WAN 108, 110. In one configuration, upon detecting the alert condition specified at step 1002, an alert message may be automatically sent by the central status server 120 to an e-mail address previously specified by the user, which may be the user's personal or corporate e-mail address or may be the email address of an external vendor that manages the hotel's private network, for example. The e-mail address may also be dynamically determined by the central status server 120 according to the private network 104 for which the alert is associated. For example, if the aggregate alert set at step 1002 is met when any private network 104 in the group 402 has a not sent a status report 310 to the central server 120 for greater than eleven minutes (e.g., when each monitoring server 222 is configured to send a report 310 at least every ten minutes) and an ISP router 232 associated with the property is also no longer pingable, an alert message may be automatically sent to an email address of the ISP NOC 112 serving the particular property. This may be beneficial because it is likely that the ISP router 232 or another aspect of the ISP network 108 serving the property 102 has failed. Alert messages may also be sent to multiple user-specified destinations at this step such as to both the user's email address and to a dynamically determined email address for the appropriate ISP NOC 112. In addition to e-mail addresses, an alert may be sent by the central server 120 to other types of user-configurable destinations such as short message service (SMS), fax alert, or voice alert sent to a user-configurable phone number, for example.

Step 1010: In this configuration, the central status server 120 waits for a delay interval (e.g., 10 minutes) before rechecking the alarm condition. This may be beneficial in order to reduce the load on the central server 120. In another configuration, the central server 120 may also return to step 1004 to regenerate the statistics every time new data (i.e., report 310) is received from a monitoring server 222 for one of the properties in the group defined at step 1000. This may be beneficial to decrease the delay between the events causing the alarm condition being met and the alarm message being sent by the central status server 120.

Step 1008 may be modified so that instead of (or in addition to) alarm messages, the central server may perform other actions when an alarm condition is met for a particular group 402. For example, if the alarm condition involves exceeding a receive bandwidth threshold, the action may involve issuing a command to the appropriate ISP NOC 112 to dynamically increase the bandwidth of connection 230. Likewise, when the receive bandwidth utilization is lower than a threshold, the central server 120 may send a command to the ISP NOC 112 to dynamically lower the bandwidth of connection 230, for example. Dynamically raising and lowering the bandwidth of connection 230 may be beneficial to help hotels or owners of hotels save costs during certain times of day based on load, for example.

Figure 11:
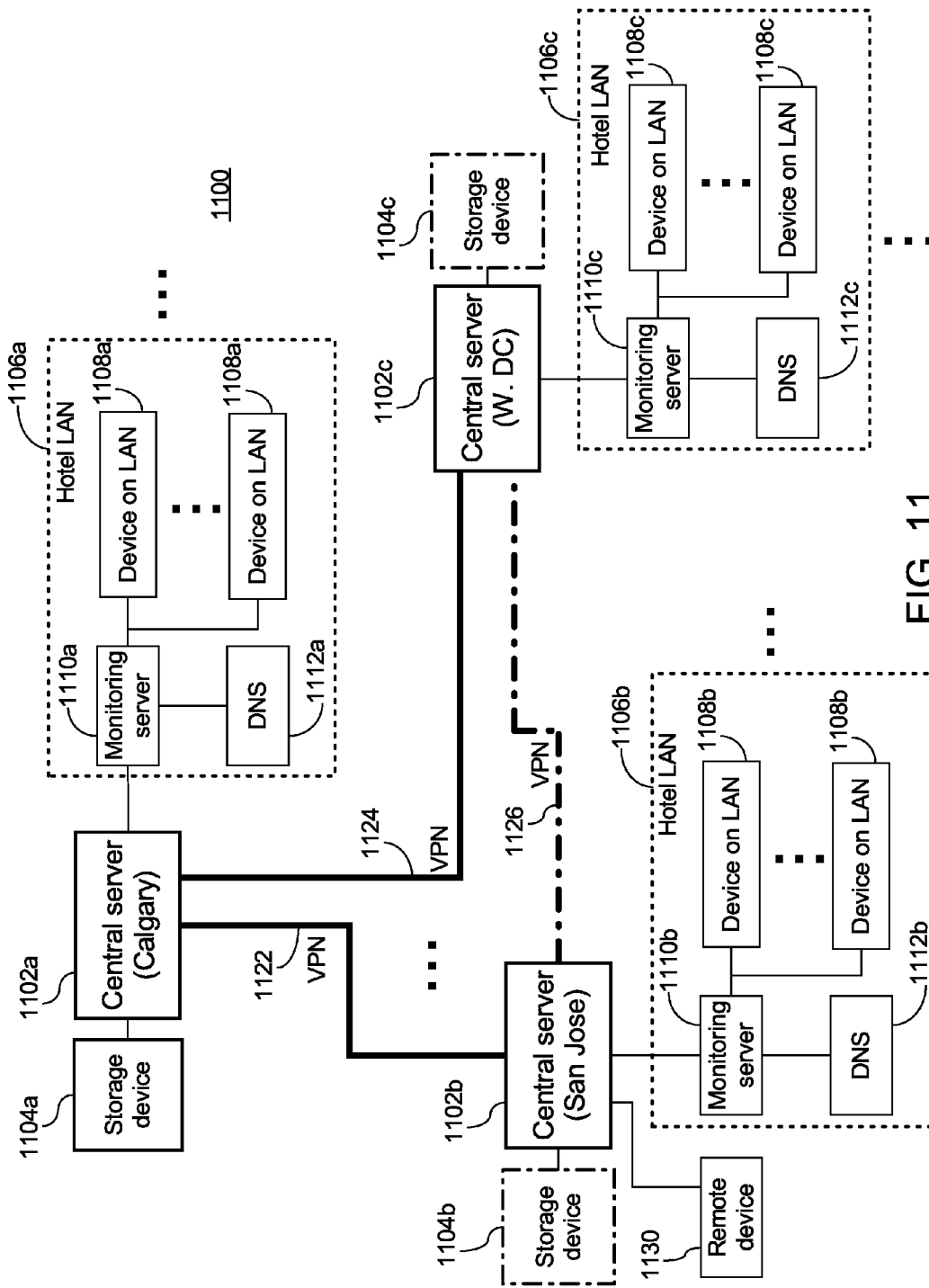
FIG. 11 illustrates a block diagram of a system for aggregate monitoring of user-based groups of private computer networks according to another exemplary configuration of the invention.

FIG. 11 illustrates a block diagram of a system 1100 for aggregate monitoring of user-based groups of private computer networks according to another exemplary configuration of the invention. Similar to the system 100 of FIG. 1, each private computer network in this example is a hotel LAN 1106 that includes a monitoring server 1110 acting as a gateway and configured for monitoring the hotel LAN 1106 by collecting statuses of devices 1108 installed on the hotel LAN 1106. However, instead of a single central server 120 as illustrated in FIG. 1, the system 1100 of FIG. 11 includes a plurality of central servers 1102 distributed so that each central server 1102 is near one or more sets of hotel LANs 1106 needing to be monitored.

Specifically, in this example, the plurality of central servers 1102 includes a first central server 1102a (e.g., located at Calgary), a second central server 1102b (e.g., located at San Jose), and a third central server 1102c (e.g., located at Washington D.C.). Three central servers 1102 are chosen in this example in order to monitor devices installed on private LANs at hotels throughout North America; however, the invention is not limited to only three central servers or to distributing the central servers 1102 throughout North America. Other numbers of central servers 1102 and associated locations may be employed in other configurations according to application-specific design requirements.

In this example, each hotel LAN 1106 is served by a local domain name service (DNS) server 1112 included either on the hotel LAN 1106 as illustrated in FIG. 11 or off the hotel LAN 1106 such as provided by an Internet Service Provider (ISP) that provides the hotel's Internet connection. The DNS servers 1112 are configured with the IP address of each of the central servers 1102; for example, each DNS server 1112 is configured with a plurality public IP addresses on the Internet that correspond to the plurality of central servers 1102. The central servers 1102 are also associated with a common URL such as central_server.example.com, for example.

To determine a nearest central server 1102, the DNS servers 1112 are configured to periodically send a message such as a ping request to the IP address of each of the central servers 1102. By measuring the time it takes each central server 1102 to reply to the message, the DNS servers 1112 may thereby determine the "nearest" central server 1102 as the one having the quickest response time. The central server 1102 nearest a particular hotel may change over time because nearest is defined in this example as having the quickest message response time (i.e., the quickest communication path), which may change over time due to network congestion. Additionally, the central sever 1102 determined to be "nearest" a particular hotel LAN 1106 may change due to central server 1102 availability, server and network load, severed network links, etc. Each DNS server 1112 periodically associates the IP address of the central server 1102 having the quickest response time with the common URL utilized by the central servers 1102.

In order to send communications related to collected status information of a particular hotel LAN 1106 to the nearest central server 1102, a monitoring server 1110 of the particular hotel LAN 1106 first performs a DNS lookup on the common URL utilized by the central servers 1102 (e.g., central_server.example.com in this example) to resolve the IP address of the nearest central server 1102. The DNS server 1112 serving the particular hotel LAN 1106 returns the IP address having the quickest message response time (e.g., quickest ping response time), which corresponds to the nearest central server 1102.

A plurality of monitoring servers 1110 may all send communications related to the collected statuses to a same selected one of the central servers 1102. For example, as illustrated in FIG. 11, one or more monitoring servers 1110a that have quick communication with the first central server 1102a send communications related to the collected statuses to the IP address of the first central server 1102a. Similarly, one or more monitoring servers 1110b that have quick communication with the second central server 1102b send communications related to the collected status to the IP address of the second central server 1102b, and one or more monitoring servers 1110c that have quick communication with the third central server 1102c send communications related to the collected statuses to the IP address of the third central server 1102c. The monitoring servers 1110 may cache the IP address of the selected central server 1102 for a predetermined time period and then re-query the local DNS server 1112 in order to accommodate changes to the selected central server 1102. Additionally, in another configuration, the above-described DNS server 1112 functionality to determine the selected (e.g., nearest) central server 1102 may be included within one or more monitoring servers 1110 rather than utilizing an external DNS server 1112.

Because the system 1100 includes a plurality of central servers 1102 each receiving communication related to collected statuses for a number of monitoring servers 1110, the system 1100 is capable of being scaled to monitor devices installed on a large number private networks (e.g., hotel LANs in this example) while avoiding the problems associated with operating system limits on the number of open network connections (e.g., TCP connections) that may be made on a single server. Server load and network traffic is also distributed over the plurality of central servers 1102, and the system 1100 is efficient because each monitoring server 1110 communicates with the nearest central server 1102 having the fastest network communications path (i.e., as measured by recent message response times).

In another configuration, the system 1100 evenly shares server load across the central servers 1102 by configuring the DNS servers 1112 to rotate through the IP addresses of the various central servers 1102 rather than always returning the IP address of the central server 1102 that has the quickest message response times. The DNS servers 1112 may still be configured to ping the IP address of each central server 1102, however, in this configuration, each DNS server 1112 then cycles (e.g., in a round robin order) through the IP addresses of the central servers 1102 that replied to the ping in order to select one of the central servers 1102. In this way, load and network traffic will tend to be evenly spread across the central servers 1102 that are currently available while automatically ignoring any central servers 1102 that become unavailable for whatever reason. Again, in another configuration, the above-described DNS server 1112 functionality to cycle through the IP addresses of the currently available central servers 1102 may be included within one or more monitoring servers 1110 rather than utilizing an external DNS server 1112.

In an advantageous application of the system 1100, a hospitality HSIA vendor may monitor thousands (or even tens of thousands) of separate hotel LANs 1106, each having thousands of installed devices 1108 of different types such as STBs, switches, servers, access points, etc. Each of the vendor's customers may also utilize the system 1100 to request and automatically receive statistics generated according to only the hotel LANs 1106 for which the customer is authorized (i.e., for only the hotel LANs 1106 that are associated with the requesting customer). By deploying a plurality of central servers 1102, each only needs to accept a fraction of the communication related to collected status information of the entire collection of hotel LANs 1106. Additionally, should one of the central servers 1102 become unavailable (i.e., server failure, scheduled maintenance, natural disaster, or other downtime), the DNS servers 1112 automatically stop resolving the common URL used by the central servers to the public IP address of the unavailable central server 1102 because the unavailable central server 1102 will not reply to message requests (e.g., ping requests). In this way, the system 1100 is also robust in that it automatically takes into account and recovers from the unavailability of any of the central servers 1102.

In an example configuration of FIG. 11, the second and third central servers 1102b,c maintain VPN connections 1122, 1124 with the first central server 1102a and may therefore access and store status records and user information in storage device 1104a. In another example configuration including the dot-dash lines of FIG. 11, the information stored in the first storage device 1104a such as user groups and status records is automatically replicated and stored locally at each of the central servers 1102 (i.e., in storage device 1104b and storage device 1104c). A VPN connection 1126 may also be maintained between the second and third central servers 1102b,c to allow the information in the storage devices 1104b,c to be replicated without involvement of the first central server 1102a. As all central servers 1102 include a storage device 1104 storing substantially the same information, this configuration of system 1100 beneficially does not include a single point of failure that would prevent the system 1100 from interacting with requesting users or with the monitoring servers 1110.

A user such as a manager of a chain of hotels may employ a remote device 1130 at any location on the Internet to send a request to any selected central server 1102 (for example, the nearest central server 1102 determined using the same DNS technique as explained above). The request indicates the requesting user that issued the request such by including a username/password or other identification information. The central server 1102 receives the request from the remote device 1130 via the WAN and determines the group of hotel LANs 1106 associated with the requesting user according to the information stored in the storage device 1104 (accessed either directly or over one of VPNs 1122, 1124, 1126). The central server 1102 then automatically generates a set of statistics according to only the statuses collected for each private network in the group associated with the requesting user and sends the set of statistics to the remote device 1130 via the Internet in response to the request.

Figure 12:
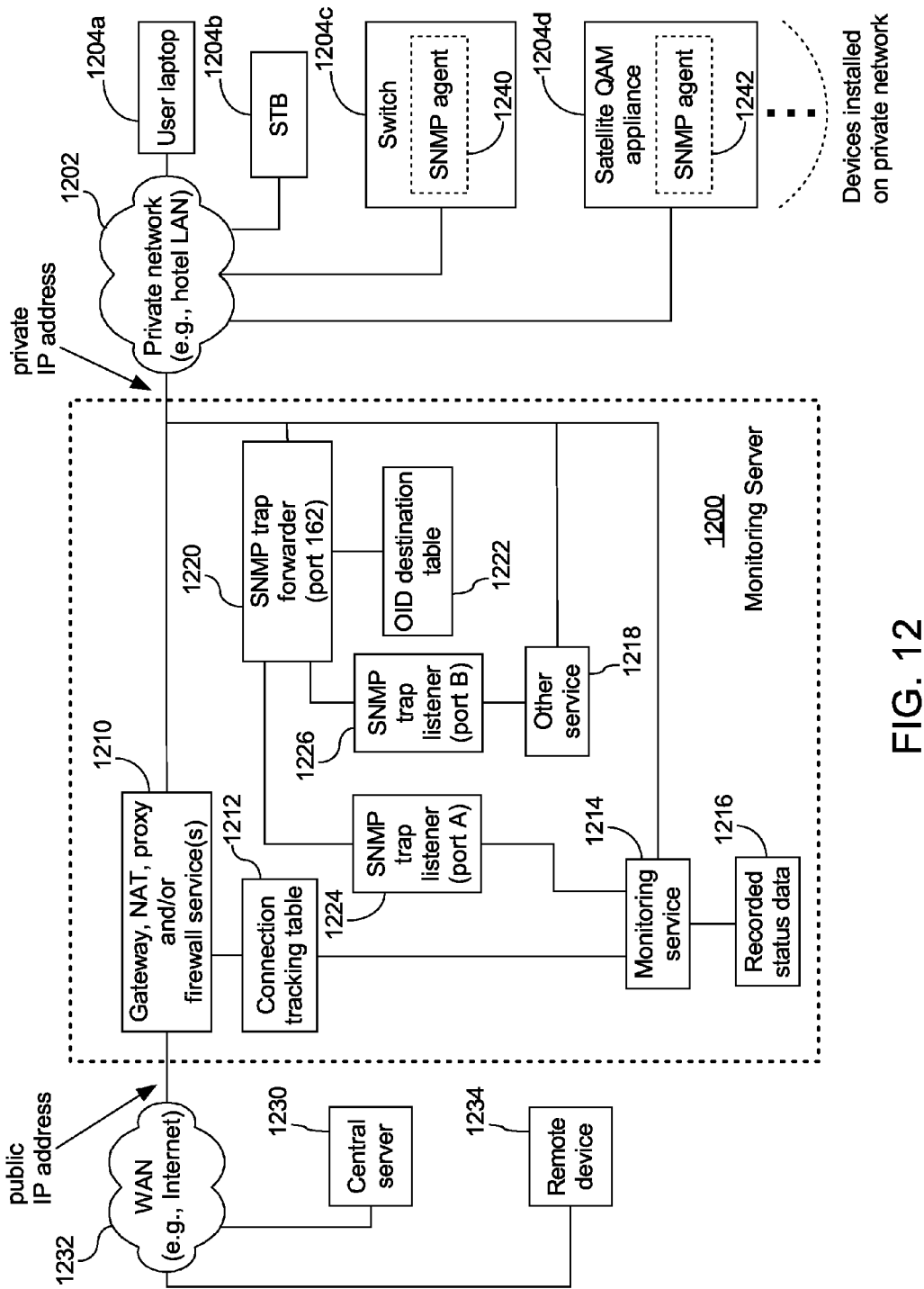
FIG. 12 illustrates a block diagram of a monitoring server included on a private network for monitoring the private network by collecting statuses of devices on the private network according to an exemplary configuration of the invention.

FIG. 12 illustrates a block diagram of a monitoring server 1200 included on a private network 1202 for monitoring the private network 1202 by collecting statuses of devices 1204 on the private network 1202 according to an exemplary configuration of the invention. In this configuration, the devices 1204 installed on the private network 1202 include a user laptop 1204*a*, a STB 1204*b*, a switch 1204*c*, and a satellite quadrature amplitude modulation (QAM) appliance 1204*d*. The monitoring server 1200 acts as a gateway between the private network 1202 and a wide area network (WAN) such as the Internet 1232, and includes a number of software and/or hardware modules including gateway/NAT/proxy/firewall services(s) 1210, a connection tracking table 1212, a monitoring service 1214, recorded status data 1216, another service such as a hotel HSIA service 1218, an SNMP trap forwarder 1220, an object identifier (OID) destination table 1222, a first SNMP trap listener 1224, and a second SNMP trap listener 1226. A central server 1230 and a remote device 1234 are coupled to the Internet 1232. The monitoring server 1200 has a private IP address on the private network 1202 and a public IP address on the Internet 1232, and the gateway/NAT/proxy/firewall services(s) 1210 control traffic passing between the private network 1202 and the Internet 1232.

The SNMP trap forwarder 1220 receives SNMP traps on the standard SNMP trap port (i.e., well-known port 162) and forwards them according to applicable destination(s) specified in the OID destination table 1222. This allows more than one device or service to receive and react to a single trap that may originate from devices on the private network that include SNMP agents 1240, 1242 such as switch 1204*c* and satellite QAM appliance 1204*d* in this example.

FIG. 13 illustrates an example of the OID destination table 1222 of FIG. 12. The OID destination table 1222 maps traps of interest to one or more applicable destinations. In this example, the OID destination table 1222 includes the following columns:

Column 1300—Trap OID: Indicates trap OIDs of interest that may be received from one or more originating SNMP agents 1240, 1242.

Column 1302—Device type: Indicates the type of the device that sent the trap.

Column 1304—Event description: Indicates an English description of the event that caused the trap. This field may be useful to help human administrators quickly understand the significance of each particular trap OID.

Column 1306—Applicable destination(s): Identifies the applicable destinations to which the trap should be forwarded. As shown, some traps are applicable to one or more ports A, B on the monitoring server 1200, which in this example correspond to first trap listener 1224 on port A and the second trap listener 1226 on port B. Ports A and B in this description are shorthand for design-specific port numbers, for example, each of the trap listeners 1224, 1226 may be bound to unused port numbers of monitoring server 1200. Some traps may also be applicable to one or more external destinations such as identified by URLs, IP addresses, and/or ports designations, for example.

Continuing the explanation of FIG. 12, assuming the SNMP agent 1240 of switch 1204*c* sends a trap to port 162 of the monitoring server 1200 indicating that Ethernet port 1 has been unplugged, the trap forwarder 1220 queries OID destination table 1222 to thereby determine that this trap OID has applicable destinations in column 1306 being "Port A" and "Port B". The trap forwarder 1220 forwards the trap to both of the specified ports A, B thereby allowing the first and second trap listeners 1224, 1226 to respectively pass the same trap to the monitoring service 1214 and the other service 1218.

According to the received trap, the monitoring service 1214 may update the recorded status data 1216 indicating the change in Ethernet port status of the switch 1204*c*. Monitoring service 1214 may then send a report indicating this change to the central server 1230 via the Internet 1232. The report may be sent immediately or at a future time as determined by the monitoring service 1214 or the central server 1230. Sending the report to the central server 1230 is beneficial to allow the central server 1230 to generate statistics related to the number of active switch ports across a group of hotel LANs including the private network 1202.

Additionally, because the trap forwarder 1220 also forwarded the trap to port B utilized by the second trap listener 1226, another service 1218 may also take appropriate action according to the trap. In this way, a monitoring server 1200 (and/or monitoring service 1214) may be added to an existing hotel LAN 1202 (or existing server on hotel LAN 1202) and begin receiving and monitoring traps while still allowing any devices (and/or other services 1218) that were already receiving and reacting to the traps to continue to do so. For example, when the other service 1218 is the hotel's HSIA service, a trap indicating that a guest has unplugged the Ethernet cable from a particular switch 1204*c* may cause the HSIA service to reset the switch 1204*c* to default security levels on the affected port. This is beneficial to allow the HSIA service 1218 to remove additional security privileges that may have been associated with the port of the switch 1204*c* as a result of an IEEE 802.1X authentication performed by user laptop 1204*a* when it was originally plugged in to that port. The trap forwarder 1220 included in the monitoring server 1200 allows other services 1218 to continue to receive traps that form a part of the statuses collected by the monitoring service 1214.

The monitoring service 1214 in this configuration also tracks the statuses of devices 1204 installed on the private network 1202 by scanning the connection tracking table 1212, which may be maintained by an operating system kernel of the monitoring server 1200. By integrating the gateway/NAT/proxy/firewall services(s) 1210 and the monitoring service 1214 on a same server 1200, the monitoring service 1214 may beneficially access the connection tracking table 1212. The gateway/NAT/proxy/firewall services(s) 1210 track information related to connections between the Internet 1232 and the hotel LAN 1202 in the connection tracking table 1212, and this information may be exposed by the kernel of the operating system and accessed by the monitoring service 1214. For example, a TCP connection may be listed in the connection tracking table 1212 as follows:

tcp 6 86360 ESTABLISHED src=172.20.8.83 dst=64.4.21.40 sport=51901 dport=80 packets=19 bytes=14633 src=64.4.21.40 dst=38.123.9.1 sport=80 dport=51901 packets=13 bytes=3574 [ASSURED] mark=0 secmark=0 17proto=unknown use=1

The above example connection information in the connection tracking table 1212 represents the following:

tcp—the protocol used for the connection. Can also be: udp, icmp, etc . . .

6—internal number that represents a tcp connection

86360—the number of seconds until this connection will time out. These values can be set/retrieved as system properties from the monitoring server 1200.

ESTABLISHED—the state of the connection.

(first) src=172.20.8.83—source IP address (the IP address of the device 1204 making the request/connection)

(first) dst=64.4.21.40—destination IP address (where the device 1204 is connected to)

(first) sport=51901—source/internal port for the connection on the monitoring server 1200 server (first) dport=80—destination port; may be utilized by the monitoring service 1214 to determine the type of activity that the device 1204 is performing. E.g. dport 80=http, 443=https, 22=ssh, etc . . .

(first) packets=19—number of packets that have been sent since the device 1204 initiated the connection (first) bytes=14633—number of bytes that have been sent since the device 1204 initiated the connection (second) src=64.4.21.40—source IP address for the reply (same as first dst—i.e., where the reply is coming from)

(second) dst=38.123.9.1—the public IP address for the monitoring server 1200

(second) sport=80—for the reply, which port it has to forward it too (same as first dst port)

(second) dport=51901—internal server port for the reply (same as first src port)

(second) packets=13—the number of packets that have been sent back as a reply to the device 1204 making the connection (second) bytes=3574—the number of bytes that have been sent back as a reply to the device 1204 making the connection

[ASSURED]—related to the connection state. If a connection is assured, it means the destination server has acknowledged the request and the two end-points (external server and device 1204) have an established connection.

The rest of the data is ignored in this example.

The monitoring service 1214 may perform a reverse IP lookup to determine what company or domain is tied to the destination IP address, which according to this example data results in the following:

whois 64.4.21.40

MS Hotmail HOTMAIL (NET-64-4-0-0-1) 64.4.0.0-64.4.63.255

American Registry for Internet Numbers NET64 (NET-64-0-0-0-0) 64.0.0.0-64.255.255.255

Therefore, the monitoring service 1214 (and/or central server 1230) may automatically determine that, at the time the sample data was collected from the connection tracking table 1212, the user of exemplary device 1204 having source IP address 172.20.8.83 was checking their email through Hotmail and accessing it through a web browser (because the connection was made on port 80). The monitoring service 1214 may automatically sample this connection data in the connection tracking table 1212 over time and thereby observe the number of packets and bytes increment as the user device 1204 sends/receives data from the Hotmail server.

The monitoring service 1214 may monitor other statistics related to Internet activity of the devices 1204 on the private network 1202 from the connection tracking table 1212. For example, by tracking all the various connections, a summary of connections for the private network 1202 may be determined by the monitoring service 1214 such as:

Total Connections: 2988

Connections for web (port 80, any state—even connections that are closed but haven't timed out): 931

Connections for web (port 80, ESTABLISHED connections): 302

A connection is not necessarily the same as a user because it depends on the application that the user is using. For example, if a guest is torrenting, the nature of how torrents work will involve the user's device 1204 opening multiple connections to multiple hosts. The monitoring service 1214 may correlate connections to individual users (or guest rooms or zones in a hotel) by cross-referencing address information in the connection tracking table 1212 with other services 1218 running on the monitoring server 1200 such as the HSIA service. For example, during a hotel's HSIA login procedure, a guest may need to authenticate their laptop 1204a from a particular hotel room, and the HSIA service 1218 may store a record that the IP address of the laptop 1204a is associated with the particular hotel room from which it was authenticated.

In an example configuration, the monitoring service 1214 periodically scans the connection tracking table 1212 to thereby monitor and collect statuses of the various devices 1204 on the private network 1202 that are utilizing the Internet. The collected status information includes how many devices are utilizing the hotel's Internet connection, what type of web services are being utilized (e.g., HTTP, SSH, VPNs, etc), how much data is being sent and received per device/user/room, the number of devices per individual user, and the Internet destinations that are being accessed.

Recorded status data 1216 is thereafter sent by the monitoring service 1214 to the central server 1230 for use in generating statistics across various groups of hotel private networks. The central server 1230 groups the data in a user friendly way in order to present summarized user-specific "views" of the data in response to requests made by requesting users. This involves the central server 1230 automatically generating a set of statistics according to status information collected from the connection tracking table 1212 on the monitoring server(s) 1200 for each private network 1202 in the group associated with a particular requesting user, and then sending the set of statistics to a remote device 1234 utilized by the particular requesting user.

Figure 16:
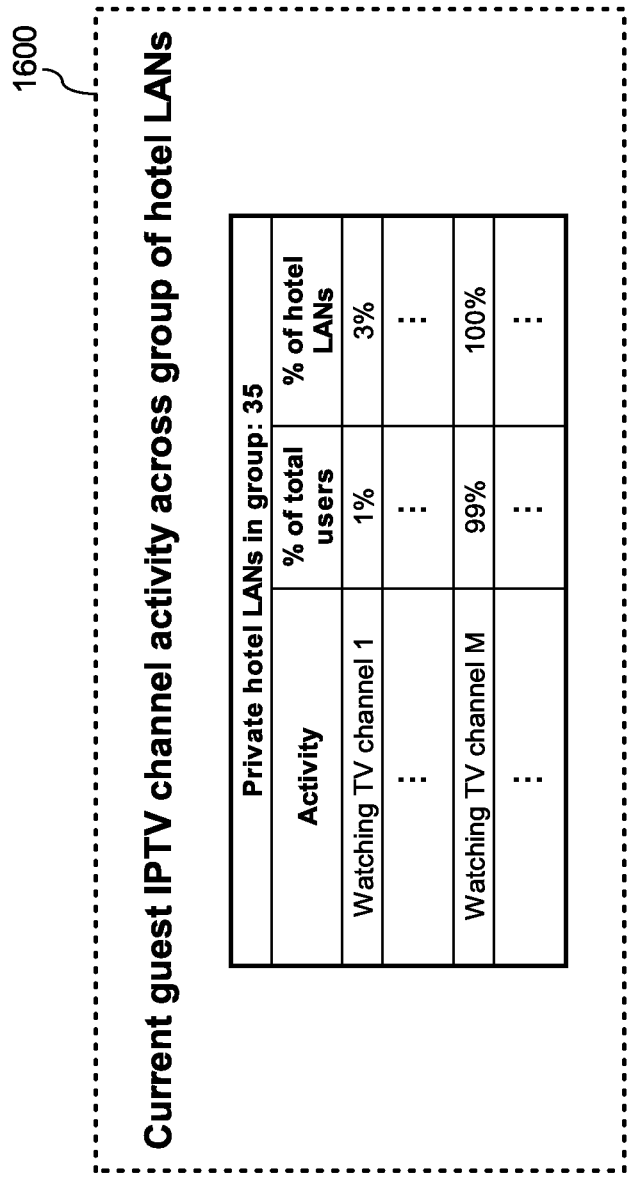
FIG. 16 illustrates a UI screen presenting an aggregate summary of current guest Internet Protocol television (IPTV) channel activity across a group of thirty-five private hotel LANs according to an exemplary configuration of the invention.

FIG. 14 to FIG. 16 illustrate various UI screens 1400, 1500, 1600 showing examples of different sets of statistics generated for user-based groups of hotel LANs by the central server 1230 and sent to the remote device 1234.

FIG. 14 illustrates a UI screen 1400 presenting an aggregate summary of satellite channel receive faults across a group of twenty-five private hotel LANs 1202 according to an exemplary configuration of the invention. Channel receive failures may be caused by a number of reasons including QAM appliance 1204d failure, satellite failure, cloud cover, and other weather conditions such as hail or snow, for example.

In this example, when a satellite QAM appliance 1204d on the hotel's LAN 1202 detects a fault with a particular channel, the QAM appliance 1204d sends a single SNMP trap message to port 162 of the monitoring server 1200. The trap forwarder 1220 receives the trap and forwards the trap to port A on the monitoring server 1200 because only port A is listed as an applicable destination in column 1306 of the OID destination table 1222 for this trap OID.

The trap listener 1224 on port A then passes the trap to monitoring service 1214, which notes the status change for the specified satellite channel in recorded status data 1216. The monitoring service 1214 sends a report to the central server 1230, and the report includes data showing that the specified satellite channel experienced a receive fault at that particular hotel LAN 1202. A similar process may also occur at other hotels and the central server 1230 receives similar reports from the monitoring servers 1200 included on the other hotel's LANs 1202.

As shown in FIG. 14, twenty-five SNMP traps reporting a receive fault with "Channel 7" have been received by the central server 1230 in the last ten minutes across the requesting user's group of twenty-five hotel LANs, which corresponds to one fault per hotel LAN in this example. The central server 1230 may thereby determine that the fault is affecting the whole group of properties associated with the requesting user and issue a notice to that effect. This is beneficial to allow a hotel chain administrator to quickly observe that there is a problem affecting devices across all hotel properties in the chain and to take corrective action. An automatic alert may also be configured to detect this condition and send a message to a user-specified destination when the condition is detected such as described above with respect to FIG. 10.

FIG. 15 illustrates a UI screen 1500 presenting an aggregate summary of current guest Internet activity across a requesting user's group of thirty-five private hotel LANs 1202 according to an exemplary configuration of the invention. This set of statistics is generated by the central server 1230 according to status information collected from the connection tracking table 1212 of gateway/NAT/proxy/firewall services(s) 1210 on each hotel LAN 1202 in the group. UI screen 1500 is beneficial to allow a hotel chain administrator to quickly observe Internet usage by hotel guests across the administrator's chain of hotels.

Rows 1500, 1502, and 1504 may be determined according to the dport values of connections in the various connection tracking tables 1212 for the hotel LANs in the requesting user's group of hotel LANs 1202. For example, row 1500 shows the percentage of total users (i.e., hotel guests) and the percentage of the hotel LANs 1202 in the requesting user's group that have least one user currently browsing Internet websites. This may be determined according to the number of connections having dport set to port 80 in the various connection tracking tables 1212 and the number of logged in HSIA users across the requesting user's group of hotel LANs 1202. Similarly, row 1502 shows the hotel user and hotel LAN percentages for VPN activity, which may be determined by looking for connections having dport set to well-known VPN port numbers such as port 1723 (point-to-point tunneling protocol, PPTP), port 500 (Internet security association and key management protocol, ISAKMP), port 1701 (layer 2 tunneling protocol L2TP), port 1194 (OpenVPN), etc. Finally, row 1504 shows the hotel user and hotel LAN percentages for bit torrent activity, which may be determined by looking for connections having dport set to well-known bit torrent ports such as 6881-6900, for example.

Rows 1508 and 1510 may be determined by the central server 1230 performing reverse IP lookups (i.e., whois searches) on destination address (dst) values of connections in the various connection tracking tables 1212 for the hotel LANs in the requesting user's group. Row 1508 may also be determined by tracking all the IP addresses used by the well-known e-mail providers, and row 1510 may also be determined by tracking all the IP addresses used by the well-known video streaming providers.

Row 1512 separates the various hotel users across the requesting user's group of hotel LANs into bandwidth levels and then indicates how many hotel users at each bandwidth level are using greater than 90% of their allocated bandwidth. In one configuration, each monitoring server 1200 periodically scans the connection tracking table 1212 to determine the number of bytes sent on each connection, and then correlates the source/destination IP addresses with particular hotel users and their registered bandwidth allocations (i.e., as selected or purchased during a hotel HSIA sign-on process). Again, this information is recorded by each monitoring server 1200 and passed to the central server 1230, which may then generate a corresponding set of statistics showing the bandwidth usage by hotel guests across the requesting user's group of hotel LANs 1202.

Row 1514 shows user and hotel LAN percentages representing multiple devices that were logged in under a single user (which may correspond to a single guest registered in a hotel room for example). This information may be gathered at each hotel by the monitoring service 1214 polling an HSIA service (e.g., other service 1218 in FIG. 12), or may be determined by scanning connection tracking table 1212 and cross referencing the various IPs with their registered hotel user(s) according to other services 1218 such as a HSIA login server. Again, this information is recorded by each monitoring server 1200 and passed to the central server 1230, which may then generate a corresponding set of statics showing the aggregate statistics across a group of hotel LANs 1202.

FIG. 16 illustrates a UI screen 1600 presenting an aggregate summary of current guest Internet Protocol television (IPTV) channel activity across a group of thirty-five private hotel LANs according to an exemplary configuration of the invention. UI screen 1600 is beneficial to allow a hotel chain administrator to quickly observe IPTV channel activity across the whole chain of hotels.

In one configuration, the recorded status data utilized to generate UI screen 1600 is obtained by the monitoring server 1200 on each hotel LAN 1202 polling the various STBs 1204b in the guest rooms in order to determine what channels they are currently viewing. In another configuration, the STBs 1204b may send information to the monitoring server 1200 as guests tune to (and tune away from) specific IPTV channels. In both cases, the monitoring server 1200 then passes this information to the central server 1230 for use in generating statistics for user-based groups of hotel LANs.

As standard STBs 1204b may not necessarily include functionality to support monitoring IPTV usage, in another configuration, the monitoring service 1214 polls various switches 1204c on the hotel LAN 1202 to determine which ports on each switch 1204c (and therefore which STBs 1204b and/or guest rooms) are joined to which IP multicast streams. This technique is also beneficial when IPTV is streamed to user devices brought by guests at the hotel as these user devices will not be capable of sending reports to the hotel's monitoring server 1200.

Taking the block diagram shown in FIG. 2 as an example, the monitoring server 222 may utilize SNMP to poll each of the intermediate distribution frame (IDF) switches 208 on the hotel's private LAN 104. Only the IDF switches need to be polled in this example because these are the switches 208 that have ports connected to STBs 204 and/or user devices 206 in the guest rooms 202. Other switches 208 on the LAN 104 such as the core switch need not be polled as no ports of the core switch are directly connected to equipment such as STBs 204 in the guest rooms 202.

Figure 17:
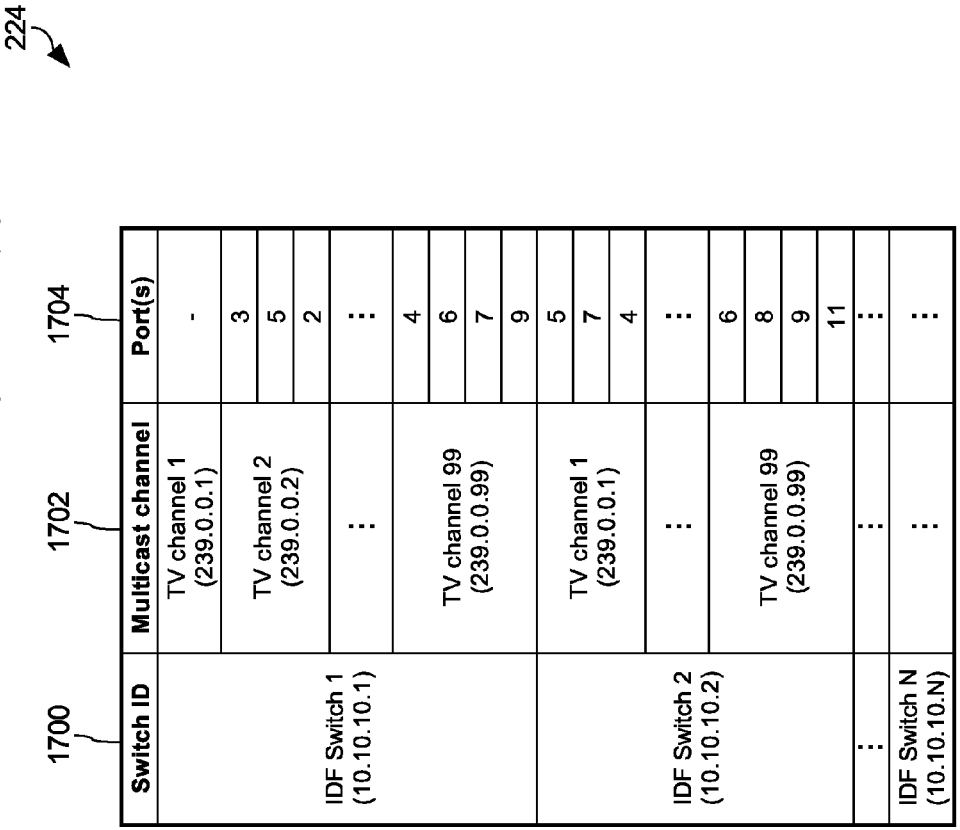
FIG. 17 illustrates an example of status data recorded by a monitoring server related to IPTV usage on a private network.

FIG. 17 illustrates an example of recorded status data 224 related to IPTV usage on the hotel's private LAN 104 as recorded by the monitoring server 222. The recorded status data 224 is organized in columns as follows:

Column 1700—Switch ID: Stores an identifier of each managed IDF switch 208 being the private IP address of the switch 208 on the private LAN 102 in this example.

Column 1702—Multicast channel: Indicates each of the possible multicast group IP addresses available in the hotel. In this example, each multicast group corresponds to an administratively-scoped (local) multicast addresses (e.g., in the form 239.XXX.XXX.XXX) corresponding to a single TV channel, which may be transmitted by a server 212 (e.g., video server functionality included in VOD server 212a) installed in the hotel. In another configuration, each multicast group may correspond to a globally-scoped (Internet-wide) multicast address (e.g., in the form 224-238.XXX.XXX.XXX) corresponding to a single TV channel as transmitted by a video server located elsewhere on the Internet 110.

Column 1704—Port(s): Stores each port that is connected to at least one host that has joined the multicast channel specified in column 1702. In this example, the hosts are either STBs 204 and/or user devices 206; however, in general a host may refer to any device that is capable of joining a multicast channel in order to watch streamed IPTV.

To collect and/or update the recorded status data shown in FIG. 17, the monitoring server 222 in this configuration queries each IDF switch 208 to determine which (if any) ports are connected to a host that is joined for each IPTV multicast group available on the hotel LAN 102. For example, assuming there are 99 IPTV channels available to guests in the hotel, the monitoring server 222 queries the first IDF switch 208 to determine which ports are associated with the multicast group for "TV channel 1". In this example, no ports of the first IDF switch 208 are associated with the multicast group for "TV channel 1" and the first row of the recorded status data 224 is updated to show a "-" in column 1704 meaning "no ports associated with multicast channel". Next, the monitoring server 222 queries the first IDF switch 208 to determine which ports are associated with the multicast group for "TV channel 2". In this example, three ports (i.e., "3", "5", and "2" in FIG. 17) are associated with "TV channel 2", which means that at least one device connected to each of these ports is viewing the channel. In a typical hotel installation, each port will be connected to a single STB 204 (or user device 206) in a specific guest room 202. The monitoring server continues the same procedure to query the first IDF switch 208 to find out which ports are associated with each of the remaining multicast groups. The monitoring server 222 then repeats the process for each of the remaining IDF switches 208 on the private LAN 104. In an alternate configuration, the monitoring server 222 may send SNMP queries to cycle through each port on each IDF switch 208 to determine which multicast channels are currently associated with each port. Using either configuration, a hotel's monitoring server 222 can take a snapshot of current IPTV channel usage by guests at the hotel. The process may be repeated by the monitoring server 222 at a designated interval to monitor for IPTV usage changes over time. If supported by the switch 208 manufacture, an SNMP trap may be configured at the switch to notify the monitoring server 222 when a port is either newly associated with or newly dissociated with a particular multicast channel. This is beneficial to reduce load and network usage from unnecessary polling.

The monitoring server 222 at each private LAN 104 repeatedly passes the recorded status data 224 to the central server 120, which may then generate an updated set of statics showing the aggregate statistics across a group of hotel LANs 104 such as the UI screen 1600 shown in FIG. 16. In this way, an administrator of a chain of hotels may view statistics showing the percentage of hotel guests across a chain of hotels watching a particular channel and the percentage of hotels belonging to the chain having at least one user watching the particular channel. Other fields such as average time spent on each channel may also be tracked in other configurations.

In another configuration, rather than the IDF switches 208, the monitoring server may instead query the core switch 208 to determine which ports are transmitting a particular multicast channel, or to determine which multicast channel(s) are being transmitting on each particular port. Although the count of how many users are watching a particular IPTV channel is unavailable with this method, the monitoring server 222 may continue to determine whether a particular IPTV channel is currently being viewed by at least one guest at the hotel, which may be sufficient in some applications. This configuration is also advantageous when only the core switch 208 is managed and therefore the monitoring server is unable to query the IDF switches or where there are no IDF switches, and/or when the hotel LAN 104 makes significant usage of wireless Aps 210.

One advantage of the present invention with respect to the hospitality market is that an external system provider may sell substantially the same private network 104 design to different properties while giving multi-property owners and administrators custom access to aggregate statistics including multiple private networks 104. The aggregate monitoring is scaleable and no provisions or advance planning are required to allow a plurality of independent private networks 104 to be later monitored as a group. For example, as an owner switches over additional hotels to the external vendor's design, the group of private networks associated with the owner is adjusted to include the private networks for the new hotel properties. In this way, the aggregate statistics automatically include the new properties and any alarms or other actions previously configured now automatically apply to the new hotels without requiring additional configuration on the part of the owner. Comparing individual statistics of devices on different private networks is also greatly simplified because the owner may utilize a single web interface to choose any number of aspects of the various properties to compare.

In the above description, the term "private network" includes computer networks that use private IP address space as set by RFC 1918 and RFC 4193, which are each incorporated herein by reference. These addresses are not globally assigned or allocated to any specific organization. IP packets addressed to a private IP address are not transmitted onto the public Internet 110, and these address ranges may be utilized without approval from a regional Internet registry (RIR). As shown in FIG. 1 and FIG. 2, private networks 104 may be coupled to the Internet 110 using a network address translator (NAT) gateway 106. A proxy server (not shown) could also be used for this purpose. One advantage that may be obtained by including at least one monitoring server 222 on each private network 104 is the private networks 104 need not be integrated with each other in any way. For example, the private IP address sub-ranges and even specific private IP addresses of devices utilized on each separate private network 104 may be exactly the same while still being monitored in an aggregate fashion. No consideration need be made by either the external vendor or the hotels about whether the various private networks 104 are compatible with each other such as may be required if trying to create a virtual private network (VPN) to join or tunnel between different private networks 104. Each monitoring server 222 may be configured to send reports 310 to a same public IP address or universal resource locator (URL) corresponding to the central server 120. Including a monitoring server 222 on each private network 104 also reduces the load on the central server 102 because the central status server 120 only needs to receive record status data 224 from each monitoring server 222 rather than all the individual devices that need to be monitored on all the private networks 104.

The invention may be beneficially employed to allow different users such as a service provider and the service provider's customers to monitor aggregate statistics generated according to statuses of devices collected for user-based groups of private networks. The service provider may deploy and monitor any number of independent private networks while also allowing each particular customer to access a set of statistics generated by a central server according to the group of private networks that are under that particular customer's control. By limiting the statistics generated by the central server to only the private networks in the group of private networks associated with the requesting user that issued the request, both the service provider and the customers may benefit from the aggregate monitoring performed by the system and confidentially is ensured between different customers. By including a monitoring server on each private network for collecting statuses of devices installed on the network, there are no VPNs required to integrate between different private networks and no advanced planning is required to ensure that devices on one private network do not conflict with devices on other private networks.

In summary, a system for aggregate monitoring of private computer networks includes a plurality of monitoring servers for monitoring a plurality of private networks. Each private network has at least one monitoring server configured for monitoring the private network by collecting statuses of devices associated with the private network. A central server is coupled to each of the monitoring servers via a wide area network (WAN) and stores information pertaining to a plurality of users. The information associates each of the users with a group of one or more of the private networks. The central server may receive a request from a remote device via the WAN, determine the group of private networks associated with the requesting user, automatically generate a set of statistics according to only the statuses collected for each private network in the group associated with the requesting user, and send the set of statistics to the remote device.

Although the invention has been described in connection with a preferred embodiment, it should be understood that various modifications, additions and alterations may be made to the invention by one skilled in the art without departing from the spirit and scope of the invention as defined in the appended claims. For example, although the description of the invention has been described as being utilized at a plurality of hotel properties, the present invention is equally applicable to other hospitality related locations and services such as hotels, motels, resorts, hospitals, apartment/townhouse complexes, restaurants, retirement centres, cruise ships, busses, airlines, shopping centers, passenger trains, etc. Similarly, the present invention is also useful for monitoring private networks outside the hospitality industry such as monitoring private corporate networks. As such, the words "guest", "staff", "administrator", "manager", "customer", "vendor", "user" and the like in the above description are meant to help the reader with an understanding of the invention in one example context only. In actual practice, their meanings should be expanded to encompass other users and situations, including where one or more refer to the same person or entity. It is also not necessary that a single external vendor manage all the private networks; instead, each private network and the central status server may be managed by one or more different entities. A monitoring server may also be added to any existing private network to include statuses of devices associated with that private network in the aggregate statistics generated by the central status server.

One or more processors (not shown) may operate pursuant to instructions stored on a machine readable storage medium to provide the functions as described for each of the monitoring and central servers. The functions of the monitoring server(s) and the central server(s) may also be combined, integrated, separated, and/or duplicated to support various applications. Also, a function described herein as being performed at a particular device may be performed at one or more other devices instead of and/or in addition to the function performed at the particular device.

In addition to a dedicated physical computing device, the word "server" may also mean a service daemon on a single computer, virtual computer, or shared physical computer or computers, for example. The words "periodically", "repeatedly", and "intermittently" are used in an interchangeable manner. The various separate configurations, elements, modules, features, and steps of the invention described above may be integrated or combined into single units. Similarly, functions of single units may be separated into multiple units. Unless otherwise specified, features described may be implemented in hardware or software according to different designs. All combinations and permutations of the above described features, configurations and examples may be utilized in conjunction with the invention.

What is claimed is:

1. A system for aggregate monitoring of Internet Protocol television (IPTV) channel activity across user-based groups of private computer networks, the system comprising:
a plurality of monitoring servers installed on a respective plurality of private networks;
each private network being a local area network (LAN) at a respective hospitality establishment and including one or more switches being intermediate distribution frame (IDF) switches having ports connected to display devices located in guest rooms of the hospitality establishment;
each private network further including at least one monitoring server operable to query the switches on the private network in order to obtain multicast stream information from the switches on the private network;
the multicast stream information indicating which of the ports of the switches are joined to which of one or more multicast streams; and
a central server coupled to each of the monitoring servers for receiving the multicast stream information from the plurality of monitoring servers via a wide area network (WAN);
the central server comprising a storage device storing information pertaining to a plurality of users, the information respectively associating each of the users with a group of one or more of the private networks;
wherein the central server includes one or more processors operable to:
receive a request from a remote device via the WAN, the request indicating a requesting user that issued the request;
determine the group of private networks associated with the requesting user according to the information stored in the storage device;
automatically generate a set of IPTV channel activity statistics according to the multicast stream information for only the group of the private networks associated with the requesting user, the set of IPTV channel activity statistics at least being generated according to a count of how many of the ports of the switches across the group are currently joined to each of the one or more multicast streams, the count for a particular multicast stream thereby reflecting a number of the display devices that are currently playing the particular multicast stream in the group of private networks associated with the requesting user; and
send the set of IPTV channel activity statistics to the remote device via the WAN in response to the request.

2. The system of claim 1, wherein each of the one or more multicast streams at a particular private network corresponds to a different IPTV channel.

3. The system of claim 2, wherein the set of IPTV channel activity statistics comprises a percentage of the private networks in the group associated with the requesting user that have at least one user currently watching a particular IPTV channel.

4. The system of claim 2, wherein the set of IPTV channel activity statistics comprises a percentage of total users across the group of private networks associated with the requesting user that are currently watching a particular IPTV channel.

5. The system of claim 1, wherein at least one of the multicast streams of a particular private network is transmitted by a video server installed on the particular private network to a local multicast address.

6. The system of claim 1, wherein at least one of the multicast streams of a particular private network is transmitted by a video server on the Internet to a global multicast address.

7. The system of claim 1, wherein the switches queried at each private network in order to obtain the multicast stream information do not include a core switch of the private network.

8. The system of claim 1, wherein the at least one monitoring server of each private network is operable to receive the multicast stream information from at least one switch by polling the at least one switch every predetermined time period.

9. The system of claim 1, wherein the at least one monitoring server of each private network is operable to receive the multicast stream information from at least one switch by receiving a simple network management protocol (SNMP) trap from the at least one switch.

10. A method of aggregate monitoring of Internet Protocol television (IPTV) channel activity across user-based groups of private computer networks, the method comprising:
 providing a plurality of monitoring servers installed on a respective plurality of private networks, each private network being a local area network (LAN) located at a respective hospitality establishment and including one or more switches being intermediate distribution frame (IDF) switches having ports connected to display devices located in guest rooms of the hospitality establishment;
 utilizing at least one monitoring server on each private network for receiving multicast stream information from the switches on the private network, wherein the multicast stream information indicates which of the ports of the switches are joined to which of one or more multicast streams;
 receiving, by a central server, the multicast stream information from the plurality of monitoring servers via a wide area network (WAN);
 storing information pertaining to a plurality of users, the information respectively associating each of the users with a group of one or more of the private networks;
 receiving a request at the central server from a remote device via the WAN, the request indicating a requesting user that issued the request;
 determining the group of private networks associated with the requesting user according to the information stored in the storage device;
 automatically generating a set of IPTV channel activity statistics according to the multicast stream information for only the group of the private networks associated with the requesting user, and generating the set of IPTV channel activity statistics at least according a count of how many of the ports of the switches across the group are currently joined to each of the one or more multicast streams, the count for a particular multicast stream thereby reflecting a number of the display devices that are currently playing the particular multicast stream in the group of private networks associated with the requesting user; and
 sending the set of IPTV channel activity statistics by the central server to the remote device via the WAN in response to the request.

11. The method of claim 10, wherein each of the one or more multicast streams at a particular private network corresponds to a different IPTV channel.

12. The method of claim 11, wherein the set of IPTV channel activity statistics comprises a percentage of total users across the group of private networks associated with the requesting user that are currently watching a particular IPTV channel.

13. The method of claim 11, wherein the set of IPTV channel activity statistics comprises a percentage of the private networks in the group associated with the requesting user that have at least one user currently watching a particular IPTV channel.

14. The method of claim 10, wherein at least one of the multicast streams of a particular private network is transmitted by a video server installed on the particular private network to a local multicast address.

15. The method of claim 10, wherein at least one of the multicast streams of a particular private network is transmitted by a video server on the Internet to a global multicast address.

16. The method of claim 10, wherein the switches from which the multicast stream information is received on each private network do not include a core switch of the private network.

17. The method of claim 10, further comprising utilizing the at least one monitoring server of each private network for receiving the multicast stream information from at least one switch by polling the at least one switch every predetermined time period.

18. The method of claim 10, further comprising utilizing the at least one monitoring server of each private network for receiving the multicast stream information from at least one switch by receiving a simple network management protocol (SNMP) trap from the at least one switch.

* * * * *